United States Patent
Chun

(10) Patent No.: US 11,438,753 B2
(45) Date of Patent: Sep. 6, 2022

(54) METHOD AND APPARATUS FOR DETERMINING SUPPORTABLE SERVICE IN WIRELESS COMMUNICATION SYSTEM

(71) Applicant: LG Electronics Inc., Seoul (KR)

(72) Inventor: Sungduck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/256,739

(22) PCT Filed: Jul. 2, 2019

(86) PCT No.: PCT/KR2019/008069
§ 371 (c)(1),
(2) Date: Dec. 29, 2020

(87) PCT Pub. No.: WO2020/009440
PCT Pub. Date: Jan. 9, 2020

(65) Prior Publication Data
US 2021/0266726 A1   Aug. 26, 2021

(30) Foreign Application Priority Data
Jul. 2, 2018 (KR) .......................... 10-2018-0076685

(51) Int. Cl.
*H04W 8/00* (2009.01)
*H04W 4/50* (2018.01)
*H04W 4/40* (2018.01)

(52) U.S. Cl.
CPC ............. *H04W 8/005* (2013.01); *H04W 4/40* (2018.02); *H04W 4/50* (2018.02)

(58) Field of Classification Search
CPC ........... H04W 4/40; H04W 4/44; H04W 4/46; H04W 8/005; H04W 76/14; H04W 76/11
See application file for complete search history.

(56) References Cited

U.S. PATENT DOCUMENTS

| | | |
|---|---|---|
| 10,912,007 B2 * | 2/2021 | Freda ..................... H04B 7/155 |
| 2017/0013648 A1 * | 1/2017 | Jung ..................... H04W 76/10 |
| 2018/0035276 A1 * | 2/2018 | Kang ..................... H04W 48/08 |
| 2018/0159935 A1 * | 6/2018 | Cavalcanti ............. H04L 67/12 |
| 2018/0160436 A1 * | 6/2018 | Park ....................... H04L 67/12 |
| 2019/0239112 A1 * | 8/2019 | Rao ...................... H04W 28/06 |

(Continued)

FOREIGN PATENT DOCUMENTS

| | | |
|---|---|---|
| KR | 10-2012-0044093 A | 5/2012 |
| KR | 10-2013-0005524 A | 1/2013 |
| KR | 10-2018-0049803 A | 5/2018 |

(Continued)

*Primary Examiner* — Dung Hong
(74) *Attorney, Agent, or Firm* — Dentons US LLP

(57) ABSTRACT

One aspect of the present disclosure provides a method for a first user equipment (UE) to identify a supportable service in a wireless communication system, the method including transmitting, to a second UE, a request that is related to a first service and includes identification information related to the first UE, receiving, from the second UE, a response to the request related to the first service, and transmitting first service data to the second UE based on the response, and thus a V2X UE can stably provide ultra-low latency, enhanced mobile broadband, and massive connectivity required in the 5G communication system.

20 Claims, 12 Drawing Sheets

(56) References Cited

U.S. PATENT DOCUMENTS

2021/0185504 A1* 6/2021 Wong ..................... H04L 67/16
2021/0287536 A1* 9/2021 Siltanen ............. G01C 21/3461

FOREIGN PATENT DOCUMENTS

| WO | WO-2017003405 A1 | * | 1/2017 | ......... H04L 41/0803 |
| WO | WO-2017052683 A1 | * | 3/2017 | ...... H04W 36/00837 |
| WO | WO-2018228527 A1 | * | 12/2018 | |
| WO | WO-2019214812 A1 | * | 11/2019 | ........... H04B 7/0608 |

* cited by examiner

[FIG. 1]
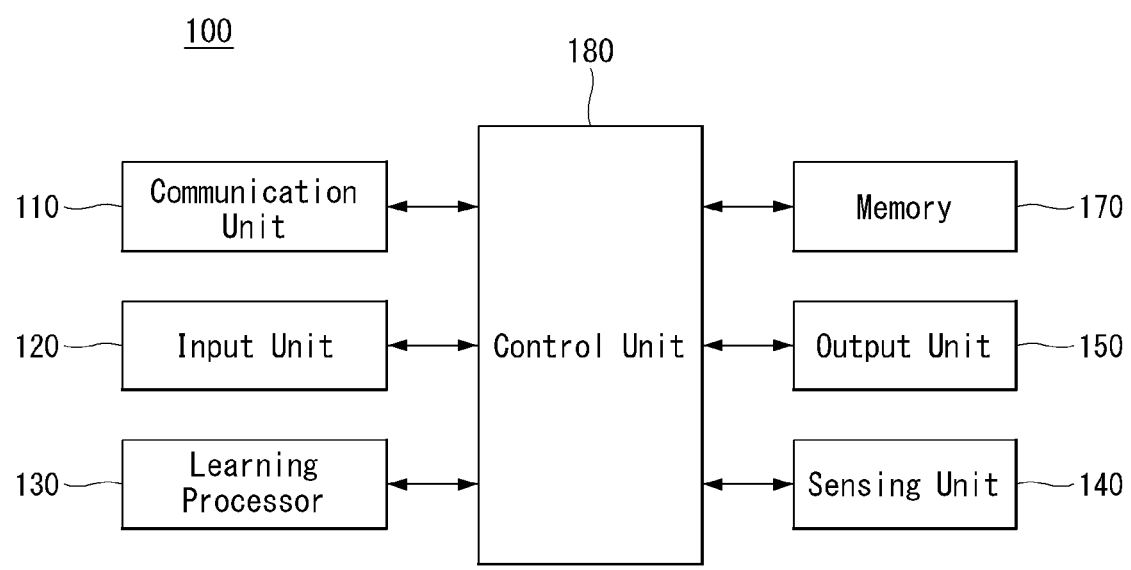

[FIG. 2]
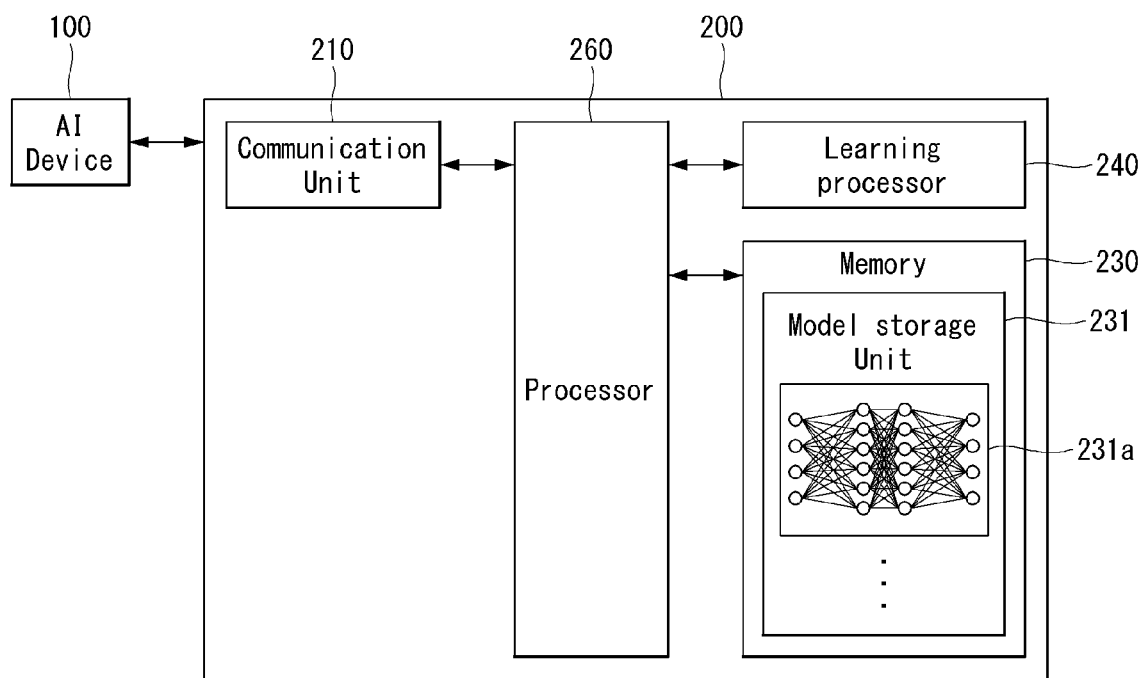

[FIG. 3]
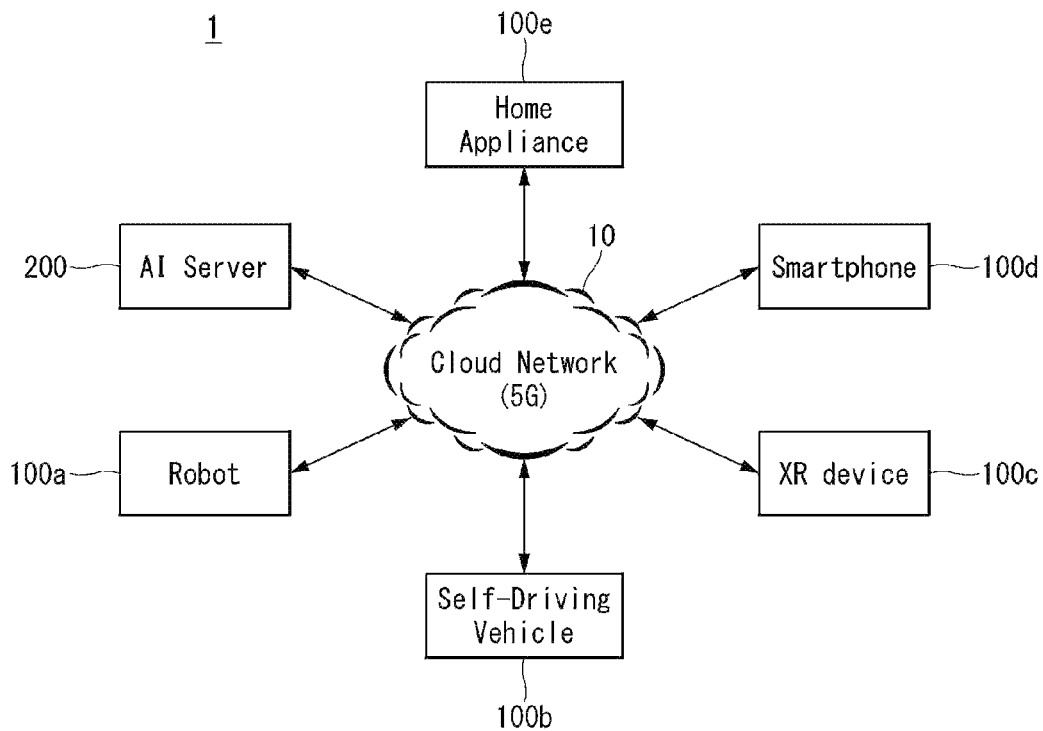
[FIG. 4]
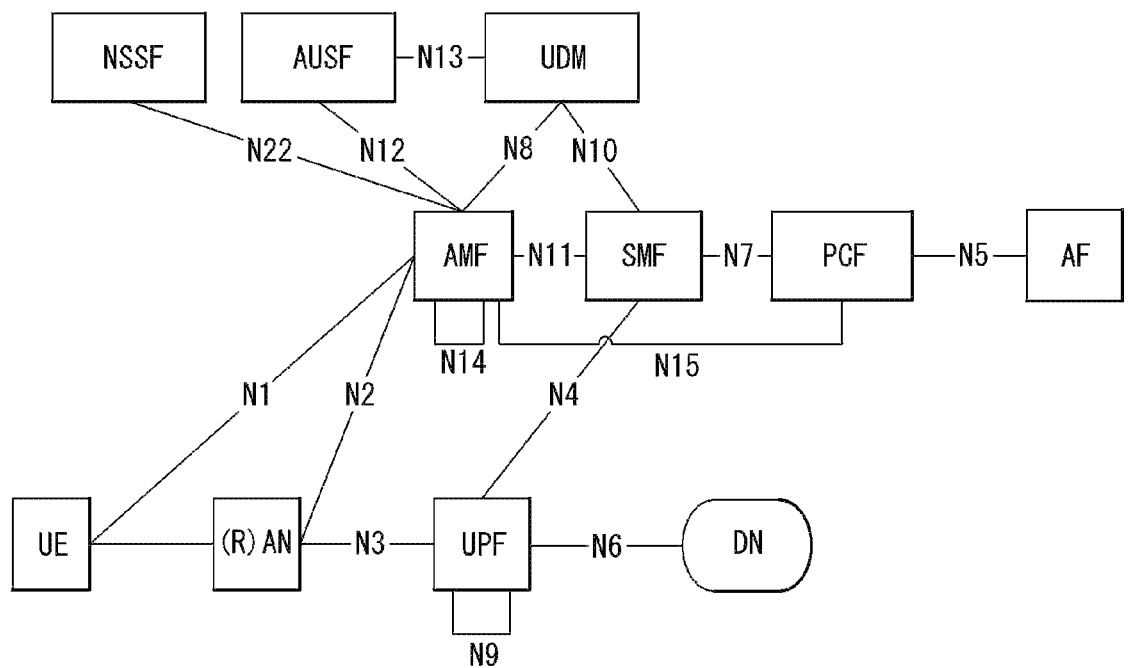

[FIG. 5]
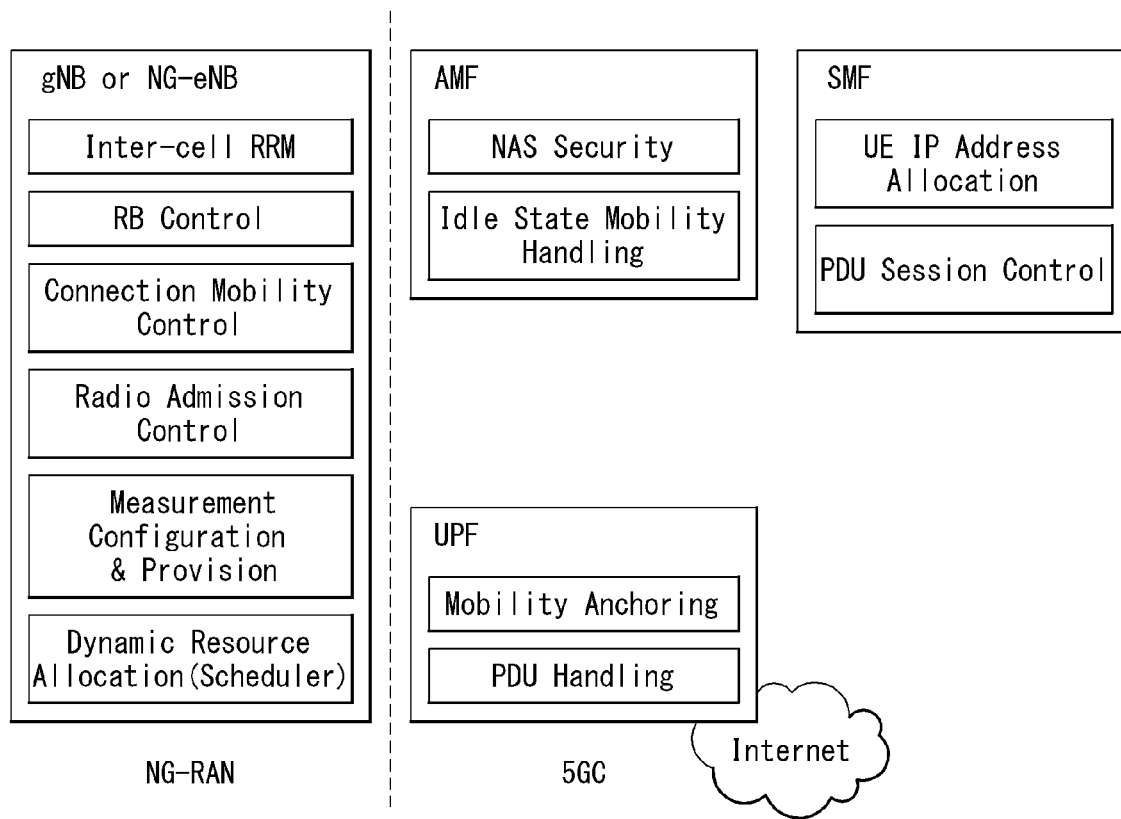
[FIG. 6]
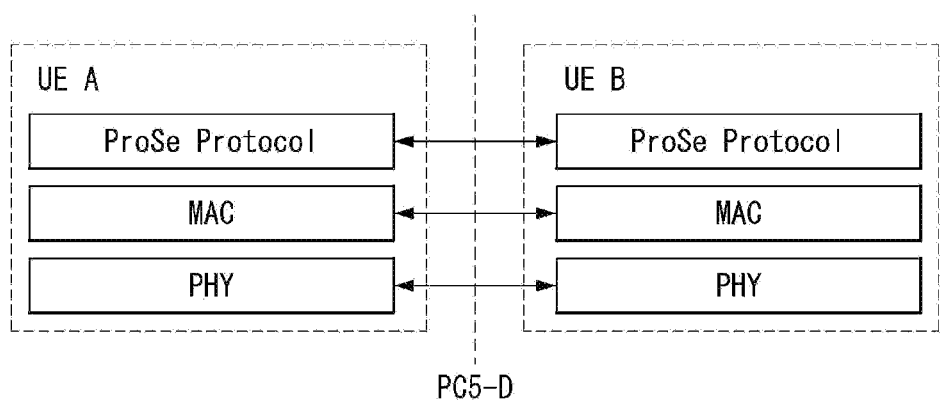

[FIG. 7]
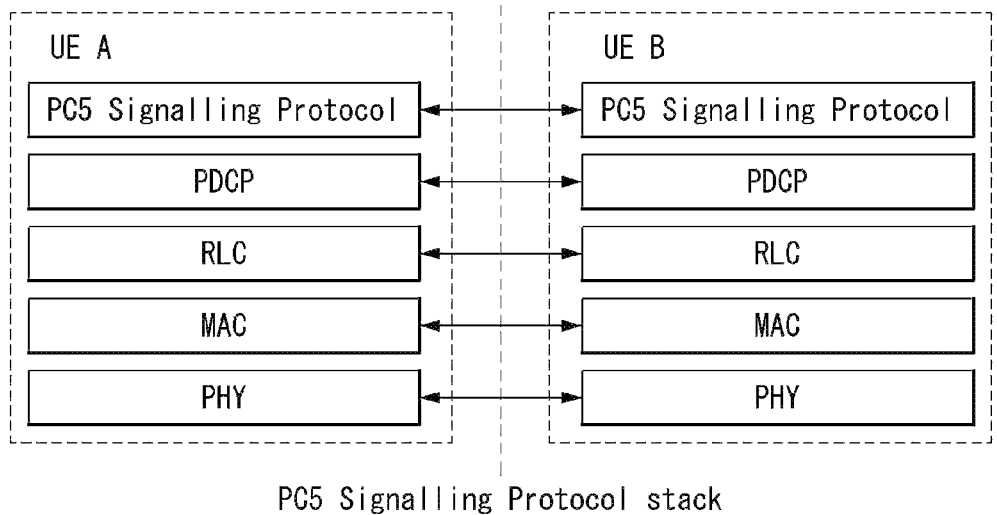
PC5 Signalling Protocol stack
[FIG. 8]
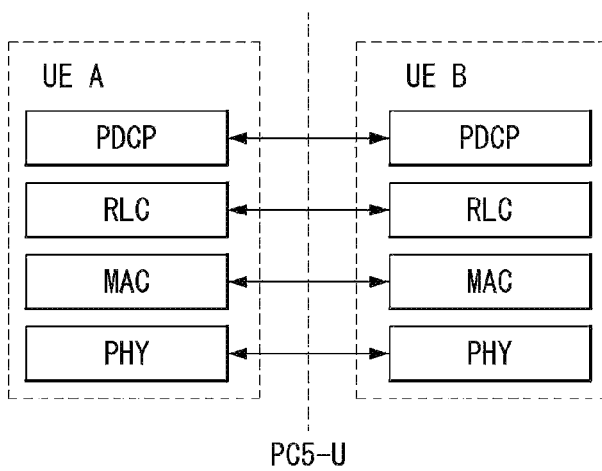

[FIG. 9]
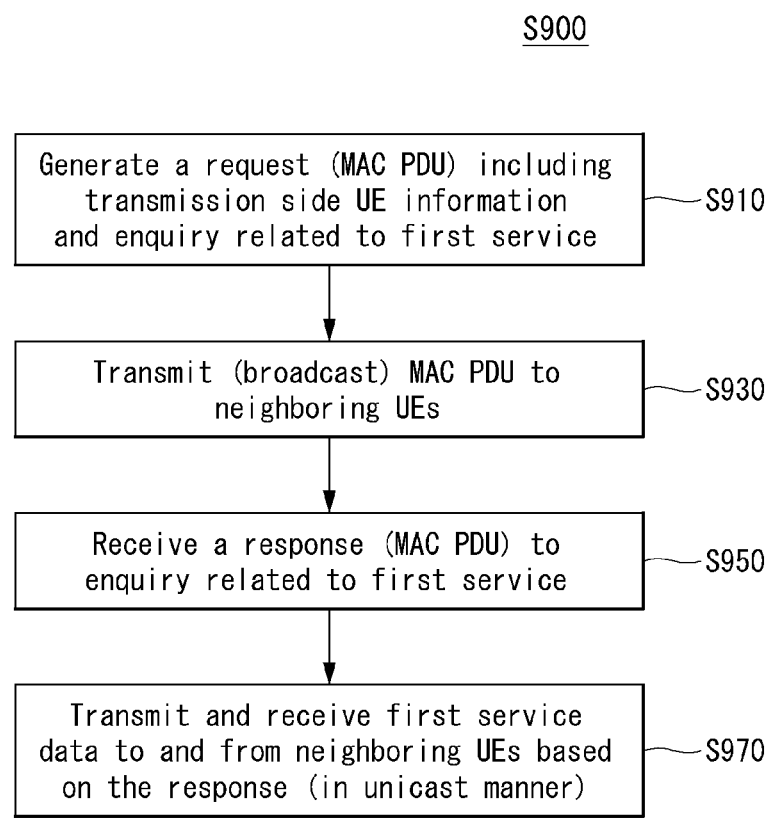

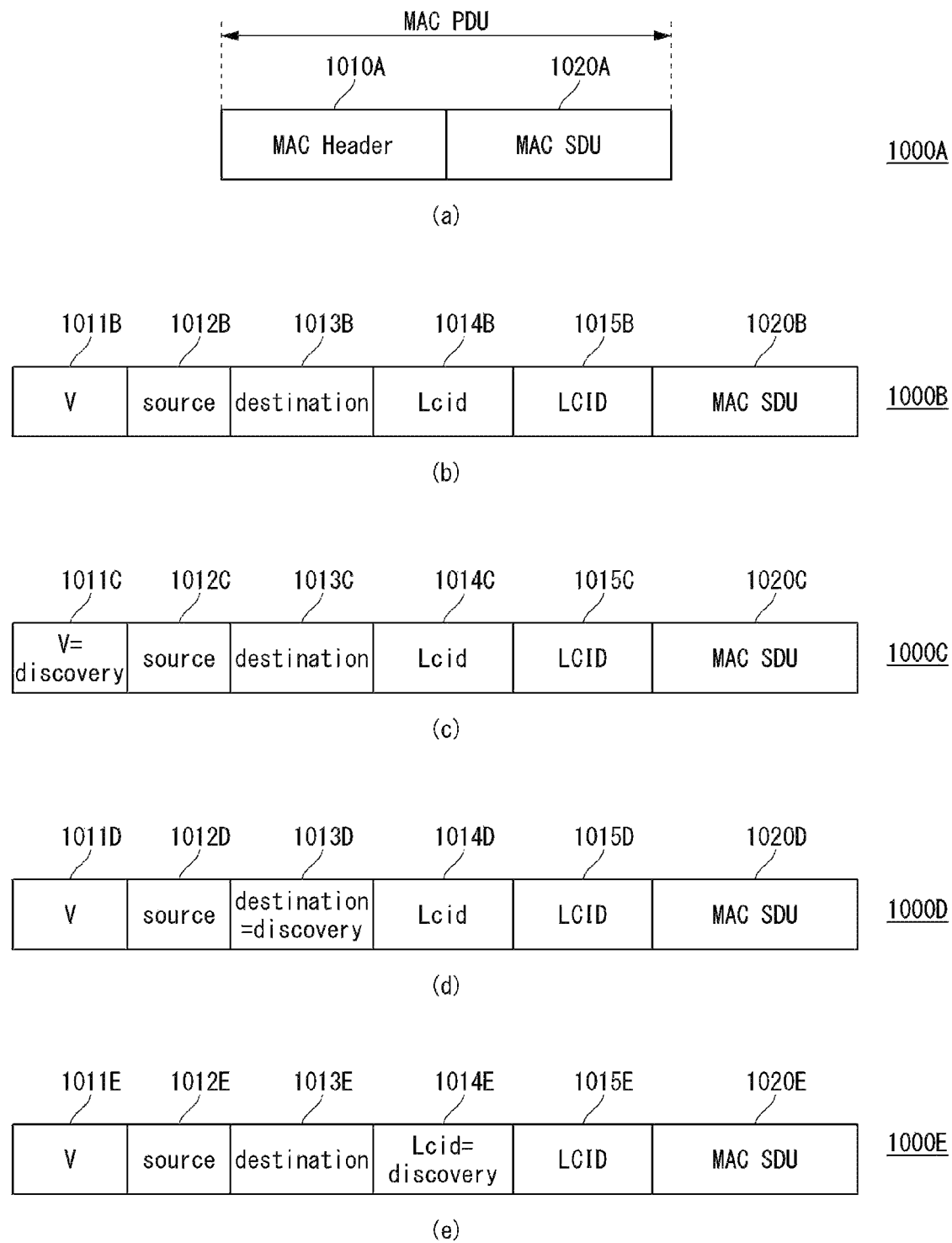

[FIG. 12]
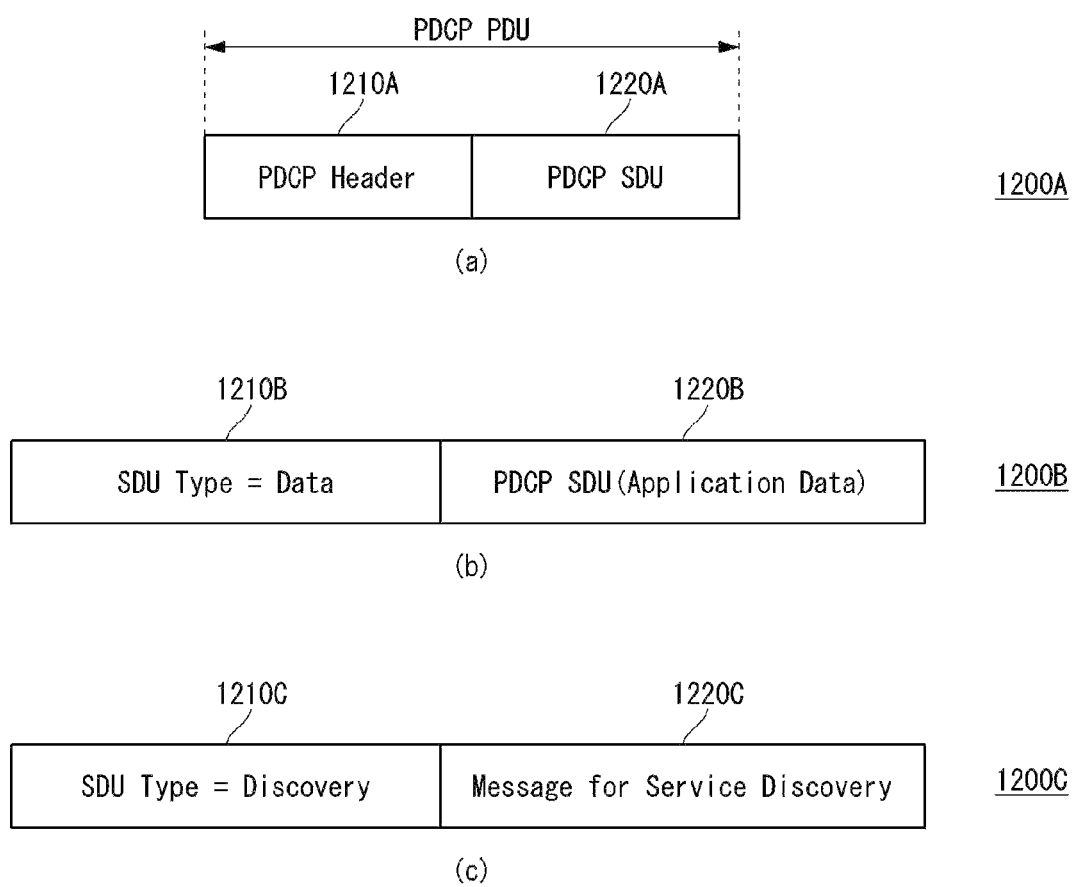

[FIG. 13]
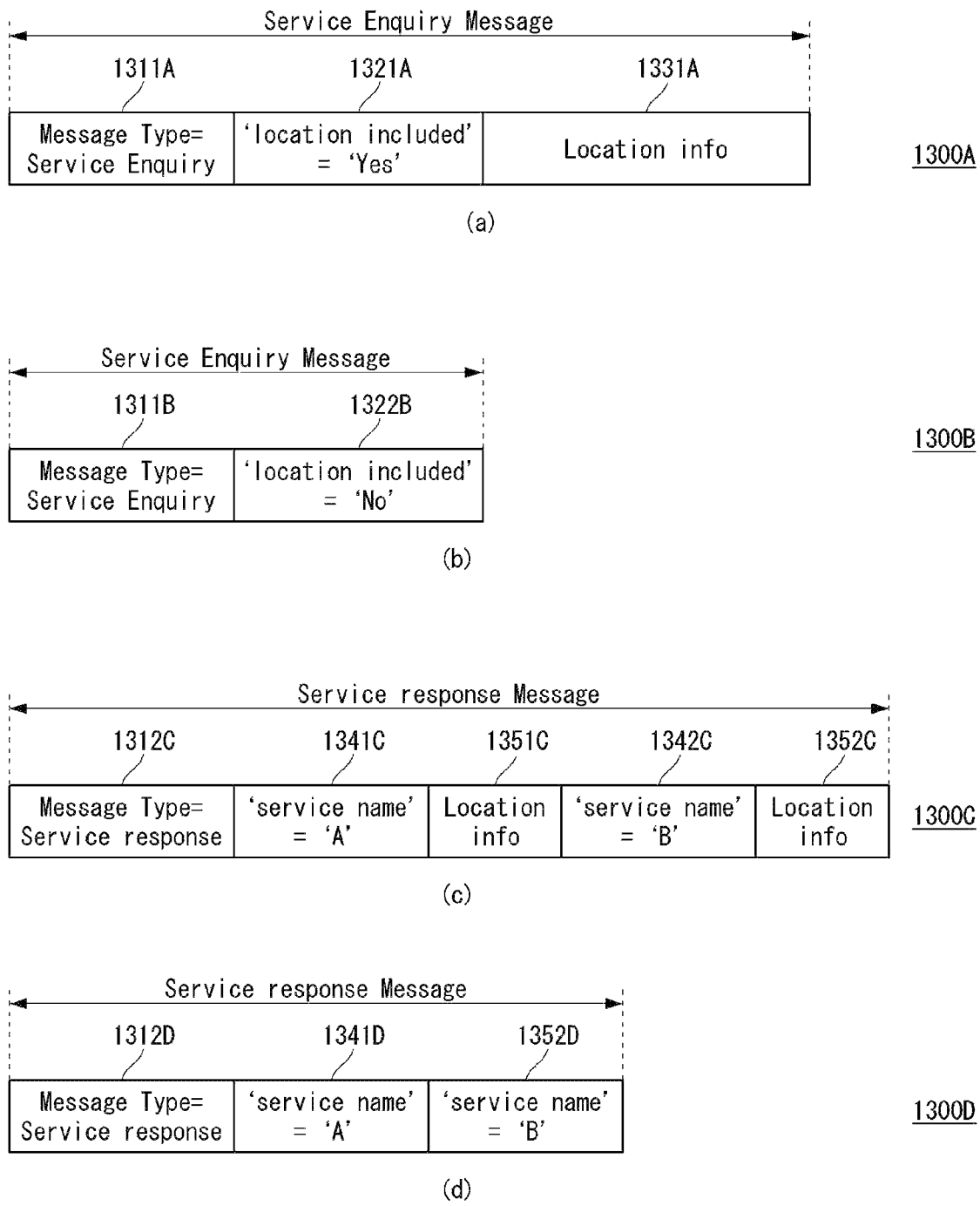

[FIG. 14]
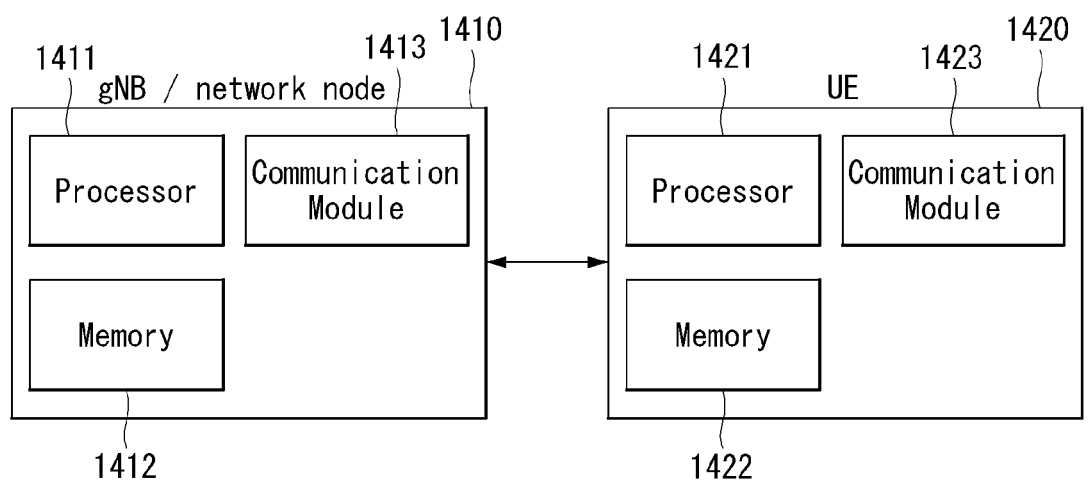

[FIG. 15]
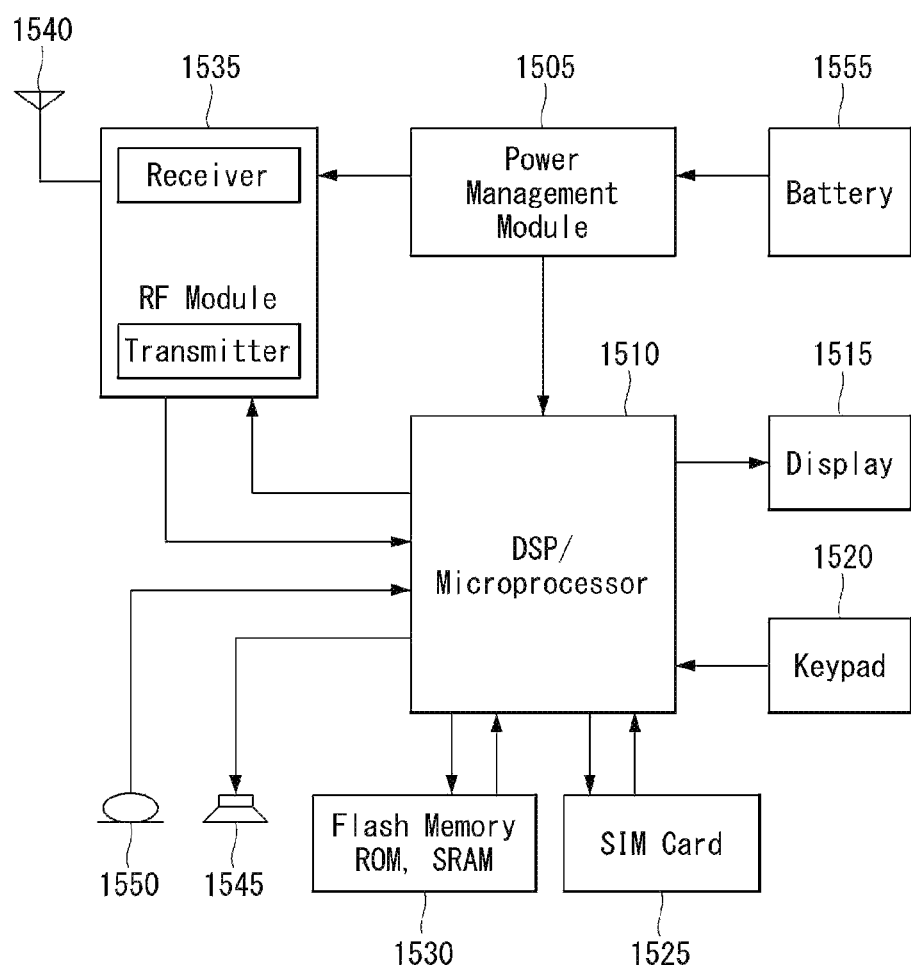

METHOD AND APPARATUS FOR DETERMINING SUPPORTABLE SERVICE IN WIRELESS COMMUNICATION SYSTEM

This application is a National Phase of PCT International Application No. PCT/KR2019/008069 filed Jul. 2, 2019, which claims priority under 35 U.S.C. 119(e) to Korean Application No. 10-2018-076685 filed Jul. 2, 2018, which are hereby incorporated by reference herein in their entirety.

TECHNICAL FIELD

The present disclosure relates to a wireless communication system, and more particularly to a method for a user equipment (UE) to identify a supportable service and a device therefor.

BACKGROUND ART

For wireless communication systems, mobile communication systems have been developed to provide voice services while ensuring user activity. However, mobile communication systems have expanded not only to voice but also to data services, and today, explosive traffic growth is causing resource shortages and users are demanding faster services, requiring more advanced mobile communication systems.

The requirements of next-generation mobile communication systems should be able to support significantly explosive data traffic, dramatic increases in per-user transmission rates, significantly increased number of connected devices, very low end-to-end latency, and high energy efficiency. To this end, various technologies as Dual Connectivity, Massive MIMO (Massive Multiple Input Multiple Output), In-band Full Duplex, NOMA (Non-Orthogonal Multiple Access), Supplying Super wideband and Device Networking are being studied.

DISCLOSURE

Technical Problem

The present disclosure provides a method for a user equipment (UE) to identify a supportable service in a wireless communication system.

The present disclosure also provides a method for a UE to identify a service provided to other neighboring UEs using service related information in a wireless communication system.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In one aspect of the present disclosure, there is provided a method for a first user equipment (UE) to identify a supportable service in a wireless communication system, the method comprising transmitting, by the first UE, a request related to a first service to a second UE; receiving, from the second UE, a response to the request related to the first service; and transmitting first service data to the second UE based on the response, wherein the request includes identification information related to the first UE.

The identification information related to the first UE may include transmission side user information of the request.

The request may include reception side user information of the request.

The first service may include a V2X service, and the request may include V2X service information for transmitting and receiving V2X service data.

The request may include service requirements for transmitting and receiving the first service data.

The request may include a request whether or not the first service is supportable.

The request may further include an indicator informing that the request whether or not the first service is supportable is included in the request.

The request may include a request for other supportable service in the second UE, other than the first service.

The request may include a request for a location at which the first service is supported.

The request may include a request for other service supported in a specific region pre-specified by the first UE.

In another aspect of the present disclosure, there is provided a first user equipment (UE) identifying a supportable service in a wireless communication system, the first UE comprising a communication module configured to transmit and receive a signal; a memory configured to store data; and a processor configured to control the communication module and the memory, wherein the processor is configured to transmit, to a second UE, a request related to a first service, receive, from the second UE, a response to the request related to the first service, and transmit first service data to the second UE based on the response, wherein the request includes identification information related to the first UE.

The identification information related to the first UE may include transmission side user information of the request.

The request may include reception side user information of the request.

The first service may include a V2X service, and the request may include V2X service information for transmitting and receiving V2X service data.

The request may include service requirements for transmitting and receiving the first service data.

The request may include a request whether or not the first service is supportable.

The request may further include an indicator informing that the request whether or not the first service is supportable is included in the request.

The request may include a request for other supportable service in the second UE, other than the first service.

The request may include a request for a location at which the first service is supported.

The request may include a request for other service supported in a specific region pre-specified by the first UE.

Advantageous Effects

Embodiments of the present disclosure can stably provide ultra-low latency, enhanced mobile broadband, and massive connectivity required in NR upon providing V2X services.

Embodiments of the present disclosure can stably and quickly provide various types of V2X services by quickly identifying, by a V2X UE, a type of supportable service.

Embodiments of the present disclosure can reduce time required to provide a specific service to a user, since a V2X UE can quickly check neighboring UEs capable of supporting the specific service.

Embodiments of the present disclosure can provide convenience to a user who wants to be provided with a specific service by quickly identifying, by a V2X UE, a specific region capable of supporting the specific service.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates an AI device 100 according to an embodiment of the present disclosure.

FIG. 2 illustrates an AI server 200 according to an embodiment of the present disclosure.

FIG. 3 illustrates an AI system 1 according to an embodiment of the present disclosure.

FIG. 4 illustrates a 5G system architecture using reference point representation.

FIG. 5 illustrates functions of NG-RAN and 5GC.

FIGS. 6 to 8 illustrate protocol layer architectures of different UEs.

FIG. 9 is a flow chart illustrating a service identification method according to a first embodiment of the present disclosure.

FIG. 10 illustrates architecture of an MAC PDU transmitted via sidelink of NR/LTE according to a first embodiment of the present disclosure.

FIG. 12 illustrates a PDCP structure according to a second embodiment of the present disclosure.

FIG. 13 illustrates a service response message according to a 3-1 embodiment.

FIG. 14 illustrates a block configuration diagram of a communication device according to an embodiment of the present disclosure.

FIG. 15 illustrates a block configuration diagram of a communication device according to an embodiment of the present disclosure.

MODE FOR INVENTION

Figure 11:
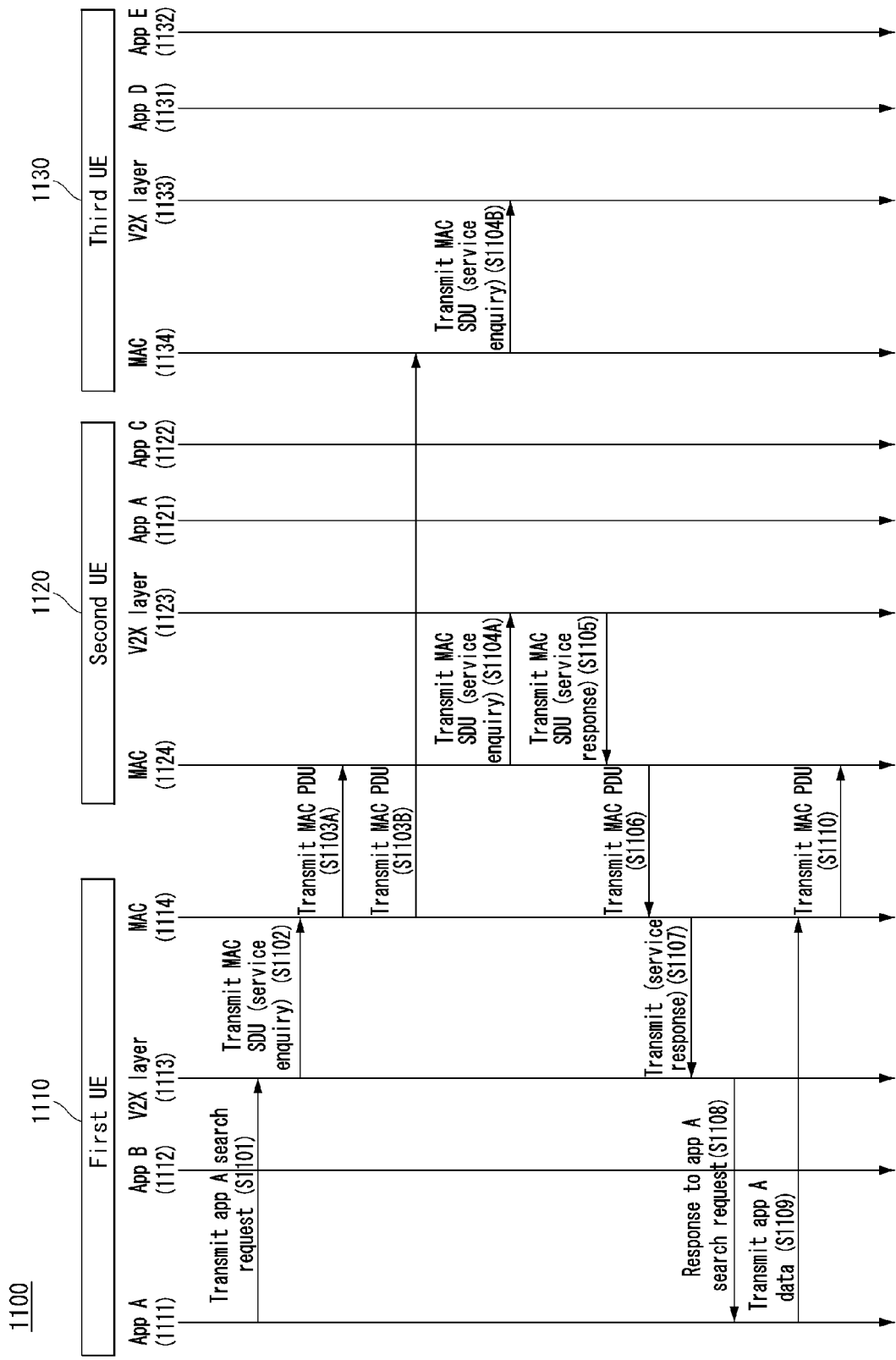
FIG. 11 illustrates an example where a UE transmits and receives information related to an application to and from other UEs in accordance with a first embodiment of the present disclosure.

Reference will now be made in detail to embodiments of the present disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core function of each structure and device.

In the present disclosure, a base station means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced by terms, such as a fixed station, Node B, evolved-NodeB (eNB), a base transceiver system (BTS), and an access point (AP). Further, a 'terminal' may be fixed or movable and may be replaced by terms such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, and a device-to-device (D2D) communication device.

In the present disclosure, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and non-orthogonal multiple access (NOMA). The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, and E-UTRA (evolved UTRA). The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in downlink and adopts the SC-FDMA in uplink. LTE-advanced (A) is an evolution of the 3GPP LTE.

Embodiments of the present disclosure can be supported by standard documents disclosed in at least one of wireless access systems including the IEEE 802, 3GPP, and 3GPP2 specifications. In other words, in embodiments of the present disclosure, those steps or parts omitted for the purpose of clearly describing technical principles of the present disclosure can be supported by the documents above. All the terms disclosed in the present disclosure can also be explained by the standard documents.

3GPP LTE/LTE-A is primarily described for clear description, but technical features of the present disclosure are not limited thereto.

Terms used in the present disclosure are defined as follows.

Universal Mobile Telecommunication System (UMTS): the 3rd generation mobile communication technology based on global system for mobile communication (GSM) developed by the 3GPP.

Evolved Packet System (EPS): a network system consisting of an evolved packet core (EPC), that is an internet protocol (IP) based packet switched core network, and an access network such as LTE and UTRAN. The EPS is a network of an evolved version of UMTS.

NodeB: a base station of a UMTS network. It is installed outdoor, and its coverage has a scale of a macro cell.

eNodeB: a base station of an EPS network. It is installed outdoor, and its coverage has a scale of a macro cell.

Home NodeB: it is installed indoors as a base station of the UMTS network, and its coverage has a scale of a macro cell.

Home eNodeB: it is installed indoors as a base station of the EPS network, and its coverage has a scale of a macro cell.

User Equipment (UE): the UE may refer to terms such as a terminal, a mobile equipment (ME), and a mobile station (MS). The UE can be a portable device such as a notebook computer, a cellular phone, a personal digital assistant (PDA), a smart phone, and a multimedia device, or a non-portable device such as a personal computer (PC) and a vehicle-mounted device. The term of UE may refer to an MTC UE in the description related to MTC.

Machine Type Communication (MTC): communication performed by machines without human intervention. It may be called Machine-to-Machine (M2M) communication.

MTC terminal (MTC UE or MTC device or MTC apparatus): a terminal (e.g., a vending machine, meter, etc.) having a communication function (e.g., communication with an MTC server over PLMN) over a mobile communication network and performing a MTC function.

Radio Access Network (RAN): a unit including a Node B and a radio network controller (RNC) and eNodeB controlling the Node B in the 3GPP network. The RAN exists at a UE end and provides a connection to a core network.

Home Location Register (HLR)/Home Subscriber Server (HSS): a database containing subscriber information within the 3GPP network. The HSS can perform functions such as configuration storage, identity management, user state storage, etc.

Public Land Mobile Network (PLMN): a network configured for the purpose of providing mobile communication services to individuals. The PLMN can be configured for each operator.

Non-Access Stratum (NAS): a functional layer for exchanging signalling and a traffic message between a UE and a core network at the UMTS and EPS protocol stacks. The NAS mainly functions to support mobility of the UE and support a session management procedure for establishing and maintaining an IP connection between the UE and PDN GW.

Service Capability Exposure Function (SCEF): an entity within the 3GPP architecture for service capability exposure that provides a means to safely expose the services and capabilities provided by 3GPP network interfaces.

Mobility Management Entity (MME): a network node in the EPS network which performs mobility management and session management functions.

Packet Data Network Gateway (PDN-GW): a network node in the EPS network which performs UE IP address allocation, packet screening and filtering, and charging data collection functions.

Serving GW (Serving Gateway): a network node in the EPS network which performs functions such as mobility anchor, packet routing, idle mode packet buffering, and triggering of paging for the UE of MME.

Policy and Charging Rule Function (PCRF): a node in the EPS network which performs policy decision to dynamically apply differentiated QoS and billing policies per each service flow.

Packet Data Network (PDN): a network in which a server (e.g., MMS server, WAP server, etc.) supporting a specific service is located.

PDN connection: a connection from the UE to the PDN, i.e., the association (connection) between the UE represented by the IP address and the PDN represented by the APN.

Hereinafter, the present disclosure is described based on the terms defined as above.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use cases may focus on only one key performance indicator (KPI). 5G supports these various use cases in a flexible and reliable method.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity in which they are always turned on in order to push real-time information and notification to a user. A cloud storage and applications suddenly increases in the mobile communication platform, and this can be applied to both business and entertainment. Furthermore, the cloud storage is a special use case that tows the growth of an uplink data transfer rate. 5G is also used for remote business of cloud. When a tactile interface is used, further lower end-to-end latency is required to maintain better user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use cases relates to a function capable of smoothly connecting embedded sensors in all fields, that is, mMTC. Until 2020, it is expected that potential IoT devices will reach 20.4 billions.

The industry IoT is one of areas in which 5G performs major roles enabling smart city, asset tracking, smart utility, agriculture and security infra.

URLLC includes a new service which will change the industry through remote control of major infra and a link with ultra reliability/low available latency, such as a self-driving vehicle. A level of reliability and latency is essential for smart grid control, industry automation, robot engineering, drone control and adjustment.

Multiple use cases are described in more detail below.

5G can supplement fiber-to-the-home (FTTH) and cable-based broadband (or DOCSIS) as means for providing a stream evaluated from several hundreds of megabits per second to gigabits per second. Such fast speed is required to deliver TV with a resolution of 4K or more (6K, 8K or more) in addition to virtual reality and augmented reality. Virtual reality (VR) and augmented reality (AR) applications include immersive sports games. A specific application program may require a special network configuration. For example, in VR games, in order for game companies to minimize latency, a core server may need to be integrated with the edge network server of a network operator.

An automotive is expected to be an important and new motive power in 5G, along with many use cases for the mobile communication of an vehicle. For example, entertainment for a passenger requires a high capacity and a high mobility mobile broadband at the same time. This reason is that future users continue to expect a high-quality connection regardless of their location and speed. Another use example of the automotive field is an augmented reality dashboard. The augmented reality dashboard overlaps and displays information, that identifies an object in the dark and notifies a driver of the distance and movement of the object, over a thing seen by the driver through a front window. In the future, a wireless module enables communication between vehicles, information exchange between a vehicle and a supported infrastructure, and information exchange between a vehicle and other connected devices (e.g., devices accompanied by a pedestrian). A safety system guides alternative courses of a behavior so that a driver can drive more safely, thereby reducing a danger of an accident. A next stage will be a remotely controlled or self-driven vehicle. This requires very reliable, very fast communication between different self-driven vehicles and between an automotive and infra. In the future, a self-driving vehicle can perform all driving activities, and a driver will focus on only abnormal traffics, which cannot be identified by a vehicle itself. Technical requirements of a self-driving vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. Similar configuration may be performed for each home. All of a temperature sensor, a window and heating controller, a burglar alarm and home appliances are wirelessly connected. Many of these sensors are typically a low data transfer rate, low energy and low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of suppliers and consumers, and thus the smart grid may improve the distribution of fuel, such as electricity, in an efficient, reliable, economical, production-sustainable and automated manner. The smart grid may be considered to be another sensor network with low latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, achieving the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but requires a wide area and reliable location information.

Embodiments of the present disclosure to be described below can be implemented through the combination or the modification in order to meet the 5G requirements described above.

The following is described in detail in relation to the technical field to which embodiments of the present disclosure to be described below can be applied.

Artificial Intelligence (AI)

Artificial intelligence means the field in which artificial intelligence or methodology capable of making the artificial intelligence is researched. Machine learning means the field in which various problems handled in the artificial intelligence field are defined and methodology for solving the problems is researched. Machine learning is also defined as an algorithm for improving performance of a task through continuous experiences for the task.

An artificial neural network (ANN) is a model used in machine learning, and may refer to the entire model with a problem-solving ability which consists of artificial neurons (nodes) forming a network through a combination of synapses. The artificial neural network may be defined by a connection pattern between neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weights, and bias that are input through a synapse.

A model parameter means a parameter determined through learning, and includes the weight of a synapse connection and the bias of a neuron. Furthermore, a hyper parameter refers to a parameter that shall be configured before learning in a machine learning algorithm, and includes a learning rate, the number of times of repetitions, a mini-deployment size, and an initialization function.

The purpose of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. The deep learning is part of the machine learning. Hereinafter, the machine learning is used as a meaning including the deep learning.

Robot

A robot may mean a machine that automatically processes a given task or operates based on an autonomously owned ability. Particularly, a robot having a function for recognizing and autonomously determining an environment and performing an operation may be called an intelligent robot.

The robot may be classified for industry, medical treatment, home, and military based on its use purpose or field.

The robot includes a driver including an actuator or motor, and can perform various physical operations, such as moving a robot joint. Furthermore, a movable robot includes a wheel, a brake, a propeller, etc. in the driver, and may run on the ground or fly in the air through the driver.

Self-Driving (Autonomous-Driving)

Self-driving means a technology for autonomous driving. A self-driving vehicle means a vehicle that runs without user manipulation or by user's minimum manipulation.

For example, self-driving may include all of a technology for maintaining a driving lane, a technology for automatically controlling speed such as adaptive cruise control, a technology for automatically driving along a fixed path, a technology for automatically setting and driving a path when a destination is set, and the like.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this instance, the self-driving vehicle may be considered as a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object together. However, there is a difference in that a virtual object is used to supplement a real object in the AR technology, and on the other hand, a virtual object and a real object are used as the same character in the MR technology.

The XR technology can be applied to a head-mount display (HMD), a head-up display (HUD), a mobile phone, a tablet PC, a laptop, a desktop, TV, a digital signage, and the like. A device to which the XR technology is applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices, such as other AI devices 100a to 100e or an AI server 200, using wired and wireless communication technologies. For example, the communication unit 110 may transmit and receive sensor information, a user input, a learning model, and a control signal to and from the external devices.

Examples of communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

The input unit 120 may include a camera for an image signal input, a microphone for receiving an audio signal, a user input unit for receiving information from a user, etc. Herein, the camera or the microphone is treated as a sensor, and thus a signal obtained from the camera or the microphone may be referred to as sensing data or sensor information.

The input unit 120 can obtain learning data for model learning and input data to be used when an output is obtained using a learning model. The input unit 120 can obtain not-processed input data. In this case, the processor 180 or the learning processor 130 can extract an input feature by performing pre-processing on the input data.

The learning processor 130 may be trained by a model constructed by an artificial neural network using learning data. In this case, the trained artificial neural network may be called a learning model. The learning model may be used to deduce a result value of new input data not learning data, and the deduced value may be used as a base for performing a given operation.

The learning processor 130 can perform AI processing along with a learning processor 240 of the AI server 200.

The learning processor 130 may include a memory integrated or implemented in the AI device 100. Alternatively, the learning processor 130 may be implemented using the memory 170, an external memory directly coupled to the AI device 100, or a memory maintained in an external device.

The sensing unit 140 can obtain at least one of internal information of the AI device 100, surrounding environment information of the AI device 100, or user information using various sensors.

Examples of sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 can generate an output related to a visual sense, an auditory sense or a tactile sense.

The output unit 150 may include a display for outputting visual information, a speaker for outputting auditory information, and a haptic module for outputting tactile information.

The memory 170 can store data supporting various functions of the AI device 100. For example, the memory 170 can store input data obtained by the input unit 120, learning data, a learning model, a learning history, etc.

The processor 180 can determine at least one executable operation of the AI device 100 based on information that is determined or generated using a data analysis algorithm or a machine learning algorithm. Furthermore, the processor 180 can perform operation determined by controlling the components of the AI device 100.

To this end, the processor 180 can request, search, receive, or utilize data of the learning processor 130 or the memory 170, and can control the components of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 can obtain intention information for a user input and transmit user requirements based on the obtained intention information.

The processor 180 can obtain the intention information corresponding to the user input using at least one of a speech to text (STT) engine for converting a voice input into a text string or a natural language processing (NLP) engine for obtaining intention information of a natural language.

In this case, at least one of the STT engine or the NLP engine may be constructed by an artificial neural network of which at least a portion is trained according to a machine learning algorithm. Furthermore, at least one of the STT engine or the NLP engine may have been trained by the learning processor 130, may have been trained by the learning processor 240 of the AI server 200, or may have been trained by distributed processing thereof.

The processor 180 may collect history information including the feedback, etc. of the user for the operation contents or an operation of the AI device 100, and may store the history information in the memory 170 or the learning processor 130 or may transmit the history information to an external device such as the AI server 200. The collected history information may be used to update a learning model.

The processor 180 may control at least some of the components of the AI device 100 in order to run an application program stored in the memory 170. Moreover, the processor 180 may combine and operate two or more of the components included in the AI device 100 in order to run the application program.

FIG. 2 illustrates an AI server 200 according to an embodiment of the present disclosure.

Referring to FIG. 2, the AI server 200 may refer to a device which is trained by an artificial neural network using a machine learning algorithm or which uses a trained artificial neural network. Herein, the AI server 200 consists of a plurality of servers and may perform distributed processing and may be defined as a 5G network. Further, the AI server 200 may be included as a partial configuration of the AI device 100 and may perform at least a part of AI processing.

The AI server 200 may include a communication unit 210, a memory 230, a learning processor 240, and a processor 260.

The communication unit 210 may transmit and receive data to and from an external device such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network, or may be mounted on an external device such as the AI device 100 and used.

The learning model may be implemented as hardware, software or a combination of hardware and software. If a part or all of the learning model is implemented as software, one or more instructions constructing the learning model may be stored in the memory 230.

The processor 260 may deduce a result value of new input data using the learning model and generate a response or a control command based on the deduced result value.

FIG. 3 illustrates an AI system 1 according to an embodiment of the present disclosure.

Referring to FIG. 3, in the AI system 1, at least one of the AI server 200, a robot 100a, a self-driving vehicle 100b, an XR device 100c, a smartphone 100d, or home appliances 100e is connected to a cloud network 10. The robot 100a, the self-driving vehicle 100b, the XR device 100c, the smartphone 100d or the home appliances 100e to which the AI technology is applied may be called AI devices 100a to 100e.

The cloud network 10 may constitute part of cloud computing infra or may mean a network present within cloud computing infra. The cloud network 10 may be configured using the 3G network, the 4G or long term evolution (LTE) network, or the 5G network.

That is, the devices 100a to 100e and 200 constituting the AI system 1 may be interconnected over the cloud network 10. In particular, the devices 100a to 100e and 200 may communicate with each other through a base station, or may directly communicate with each other without the intervention of the base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that are AI devices constituting the AI system 1, over the cloud network 10, and may help at least part of the AI processing of the connected AI devices 100a to 100e.

The AI server 200 can train an artificial neural network based on a machine learning algorithm in place of the AI devices 100a to 100e, and can directly store a learning model or transmit the learning model to the AI devices 100a to 100e.

The AI server 200 can receive input data from the AI devices 100a to 100e, deduce a result value of the received input data using the learning model, generate a response or control command based on the deduced result value, and transmit the response or control command to the AI devices 100a to 100e.

Alternatively, the AI devices 100a to 100e can directly deduce a result value of input data using a learning model, and can generate a response or a control command based on the deduced result value.

Various implementations of the AI devices 100a to 100e to which the above-described technologies are applied are described below. Herein, the AI devices 100a to 100e illustrated in FIG. 3 may be considered as detailed implementations of the AI device 100 illustrated in FIG. 1.

AI and Robot to which the Present Disclosure is Applicable

The AI technology is applied to the robot 100a, and the robot 100a may be implemented as a guidance robot, a transport robot, a cleaning robot, a wearable robot, an entertainment robot, a pet robot, an unmanned aerial robot, etc.

The robot 100a may include a robot control module for controlling an operation. The robot control module may mean a software module or a chip in which a software module is implemented using hardware.

The robot 100a may obtain status information of the robot 100a, detect (recognize) a surrounding environment and an object, generate map data, determine a moving path and a running plan, determine a response to a user interaction, or determine an operation, using sensor information obtained from various types of sensors.

The robot 100a may use sensor information obtained by at least one sensor of LIDAR, a radar, and a camera in order to determine the moving path and the running plan.

The robot 100a may perform the above operations using a learning model consisting of at least one artificial neural network. For example, the robot 100a may recognize a surrounding environment and an object using the learning model, and determine an operation using the recognized surrounding environment information or object information. Herein, the learning model may have been directly trained in the robot 100a or may have been trained in an external device such as the AI server 200.

The robot 100a may directly generate results using the learning model and perform an operation, but may perform an operation by transmitting sensor information to an external device such as the AI server 200 and receiving results generated in response to this.

The robot 100a may determine the moving path and the running plan using at least one of map data, object information detected from sensor information, or object information obtained from the external device. The robot 100a may run along the determined moving path and running plan by controlling the driver.

The map data may include object identification information for various objects disposed in the space in which the robot 100a moves. For example, the map data may include object identification information for fixed objects, such as a wall and a door, and movable objects, such as a flowerpot and a desk. Furthermore, the object identification information may include a name, a type, a distance, a location, etc.

Furthermore, the robot 100a may perform an operation or run by controlling the driver based on a user's control/interaction. In this case, the robot 100a may obtain intention information of interaction according to a user's behavior or voice utterance, may determine a response based on the obtained intention information, and may perform an operation.

AI and Self-Driving to which the Present Disclosure is Applicable

The AI technology is applied to the self-driving vehicle 100b, and the self-driving vehicle 100b may be implemented as a mobile robot, a vehicle, an unmanned aerial vehicle, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as the component of the self-driving vehicle 100b, but may be configured as separate hardware outside the self-driving vehicle 100b and connected to the self-driving vehicle 100b.

The self-driving vehicle 100b may obtain status information of the self-driving vehicle 100b, detect (recognize) a surrounding environment and object, generate map data, determine a moving path and a running plan, or determine an operation, using sensor information obtained from various types of sensors.

In order to determine the moving path and the running plan, the self-driving vehicle 100b may use sensor information obtained from at least one sensor among LIDAR, a radar and a camera, in the same manner as the robot 100a.

Particularly, the self-driving vehicle 100b may recognize an environment or an object in an area in which a sight is blocked or an area of a predetermined distance or more by receiving sensor information from external devices, or may receive information that is directly recognized from the external devices.

The self-driving vehicle 100b may perform the above operations using a learning model consisting of at least one artificial neural network. For example, the self-driving vehicle 100b may recognize a surrounding environment and object using a learning model and determine a running path using the recognized surrounding environment information or object information. Herein, the learning model may have been directly trained in the self-driving vehicle 100b or may have been trained in an external device such as the AI server 200.

In this instance, the self-driving vehicle 100b may directly generate results using the learning model to perform an operation, but may perform an operation by transmitting sensor information to an external device such as the AI server 200 and receiving results generated in response to this.

The self-driving vehicle 100b may determine a moving path and a running plan using at least one of map data, object information detected from sensor information, or object information obtained from an external device. The self-driving vehicle 100b may run based on the determined moving path and running plan by controlling the driver.

The map data may include object identification information for various objects disposed in the space (e.g., road) on which the self-driving vehicle 100b runs. For example, the map data may include object identification information for fixed objects, such as a streetlight, a rock, and a building, etc., and mobile objects, such as a vehicle and a pedestrian.

Furthermore, the object identification information may include a name, a type, a distance, a location, etc.

Furthermore, the self-driving vehicle 100b may perform an operation or run by controlling the driver based on a user's control/interaction. In this case, the self-driving vehicle 100b may obtain intention information of an interaction according to a user' behavior or voice speaking, may determine a response based on the obtained intention information, and may perform an operation.

AI and XR to which the Present Disclosure is Applicable

The AI technology is applied to the XR device 100c, and the XR device 100c may be implemented as a head-mount display (HMD), a head-up display (HUD) provided in a vehicle, television, a mobile phone, a smartphone, a computer, a wearable device, home appliances, a digital signage, a vehicle, a fixed robot or a mobile robot.

The XR device 100c may generate location data and attributes data for three-dimensional (3D) points by analyzing 3D point cloud data or image data obtained through various sensors or from an external device, may obtain information on a surrounding space or real object based on the generated location data and attributes data, and may output an XR object by rendering the XR object. For example, the XR device 100c may output an XR object including additional information for a recognized object by making the XR object correspond to the corresponding recognized object.

The XR device 100c may perform the above operations using a learning model consisting of at least one artificial neural network. For example, the XR device 100c may recognize a real object in 3D point cloud data or image data using a learning model, and may provide information corresponding to the recognized real object. In this case, the learning model may have been directly trained in the XR device 100c or may have been trained in an external device such as the AI server 200.

In this instance, the XR device 100c may directly generate results using a learning model and perform an operation, but may perform an operation by transmitting sensor information to an external device such as the AI server 200 and receiving results generated in response to this.

AI, Robot and Self-Driving to which the Present Disclosure is Applicable

The AI technology and the self-driving technology are applied to the robot 100a, and the robot 100a may be implemented as a guidance robot, a transport robot, a cleaning robot, a wearable robot, an entertainment robot, a pet robot, an unmanned aerial robot, etc.

The robot 100a to which the AI technology and the self-driving technology are applied may mean a robot itself having a self-driving function, or may mean the robot 100a interacting with the self-driving vehicle 100b.

The robot 100a with the self-driving function may collectively refer to devices that move by itself along a given path without control of a user or determine by itself a moving path and move.

The robot 100a with the self-driving function and the self-driving vehicle 100b may use a common sensing method to determine one or more of a moving path or a running plan. For example, the robot 100a with the self-driving function and the self-driving vehicle 100b may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or an operation associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if it is determined that a driver is in a drowsiness state, the robot 100a may activate the self-driving function of the self-driving vehicle 100b or assist control of a driving unit of the self-driving vehicle 100b. Herein, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information including signal information, etc., as in a smart traffic light, and may automatically connect an electric charger to a filling inlet through an interaction with the self-driving vehicle 100b as in the automatic electric charger of an electric vehicle.

AI, Robot and XR to which the Present Disclosure is Applicable

The AI technology and the XR technology are applied to the robot 100a, and the robot 100a may be implemented as a guidance robot, a transport robot, a cleaning robot, a wearable robot, an entertainment robot, a pet robot, an unmanned aerial robot, a drone, etc.

The robot 100a to which the XR technology is applied may mean a robot that is a target of control/interaction within an XR image. In this case, the robot 100a is different from the XR device 100c, and they may operate in conjunction with each other.

If the robot 100a that is a target of control/interaction within the XR image obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at time of the robot 100a remotely operating in conjunction through an external device such as the XR device 100c, may adjust a self-driving path of the robot 100a through an interaction, may control an operation or driving, or may identify information of a surrounding object.

AI, Self-Driving and XR to which the Present Disclosure is Applicable

The AI technology and the XR technology are applied to the self-driving vehicle 100b, and the self-driving vehicle 100b may be implemented as a mobile robot, a vehicle, an unmanned aerial vehicle, etc.

The self-driving vehicle 100*b* to which the XR technology is applied may mean a self-driving vehicle provided with a means for providing an XR image or a self-driving vehicle that is a target of control/interaction within the XR image. Particularly, the self-driving vehicle 100*b* that is the target of control/interaction within the XR image is different from the XR device 100*c*, and they may operate in conjunction with each other.

The self-driving vehicle 100*b* provided with the means for providing the XR image may obtain sensor information from sensors including a camera, and may output the XR image generated based on the obtained sensor information. For example, the self-driving vehicle 100*b* includes an HUD, and may provide a passenger with an XR object corresponding to a real object or an object within a screen by outputting an XR image.

In this case, when the XR object is output to the HUD, at least a part of the XR object may be output to overlap with a real object toward which a passenger's view is directed. On the other hand, when the XR object is output to a display included within the self-driving vehicle 100*b*, at least a part of the XR object may be output to overlap with an object within a screen. For example, the self-driving vehicle 100*b* may output XR objects corresponding to objects, such as a carriageway, other vehicles, a traffic light, a signpost, a two-wheeled vehicle, a pedestrian, and a building.

If the self-driving vehicle 100*b* that is a target of control/interaction within an XR image obtains sensor information from sensors including a camera, the self-driving vehicle 100*b* or the XR device 100*c* may create an XR image based on the sensor information, and the XR device 100*c* may output the created XR image. Furthermore, the self-driving vehicle 100*b* may operate based on a control signal received through an external device, such as the XR device 100*c*, or a user's interaction.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution or a clean-state structure of an existing mobile communication network structure.

The 5G system is defined as service-based, and the interaction between network functions (NFs) in architecture for the 5G system can be represented in two ways as follows.

Reference point representation: shows the interaction between NF services in NFs described by a point-to-point reference point (e.g., N11) between two NFs (e.g., AMF and SMF).

Service-based representation: network functions (e.g., AMF) within a control plane (CP) enable other authorized network functions to access their services. This representation also includes a point-to-point reference point, if necessary.

FIG. 4 illustrates a 5G system architecture using reference point representation.

Referring to FIG. 4, the 5G system architecture may include various components (i.e., network functions (NFs)). FIG. 4 illustrates some of the various components, for example, a network slice selection function (NSSF), an authentication server function (AUSF), a (core) access and mobility management function (AMF), a session management function (SMF), a policy control function (PCF), an application function (AF), a unified data management (UDM), a data network (DN), a user plane function (UPF), a (radio) access network ((R)AN), and a user equipment (UE).

The respective NFs support the following functions.

The NSSF provides different network slices to the UE.

The AUSF stores data for the authentication of the UE.

The AMF provides a function for the connection and mobility management for each UE, and one AMF can be basically connected to one UE.

More specifically, the AMF supports functions of inter-CN node signaling for mobility between 3GPP access networks, termination of RAN CP interface (i.e., N2 interface), termination N1 of NAS signaling, NAS signaling security (NAS ciphering and integrity protection), AS security control, registration management (registration area management), connection management, idle mode UE reachability (including control and execution of paging retransmission), mobility management control (subscription and policy), support of intra-system mobility and inter-system mobility, support of network slicing, SMF selection, lawful intercept (for the interface to AMF event and L1 system), providing the delivery of a session management (SM) message between UE and SMF, transparent proxy for routing the SM message, access authentication, access authorization including roaming authority check, providing the delivery of a short message service (SMS) message between UE and SMS function (SMSF), security anchor function (SEA) and/or security context management (SCM), and the like.

Some or all functions of the AMF can be supported in a single instance of one AMF.

The DN means, for example, operator services, internet access, or 3rd party service. The DN transmits a downlink protocol data unit (PDU) to the UPF or receives the PDU transmitted from the UE from the UPF.

The PCF receives information about packet flow from an application server and provides functions of determining policies such as mobility management and session management. More specifically, the PCF supports functions of supporting a unified policy framework for controlling a network operation, providing a policy rule so that CP function(s) (e.g., AMF, SMF, etc.) can enforce the policy rule, and implementing a front end for accessing related subscription information for policy decision in a user data repository (UDR).

The SMF provides a session management function. If the UE has multiple sessions, the sessions can be respectively managed by different SMFs.

More specifically, the SMF supports functions of session management (e.g., session establishment, modification, and release, including tunnel maintenance between the UPF and the AN node), UE IP address allocation and management (including optional authentication), selection and control of UP function, configuring traffic steering at UPF to route traffic to proper destination, termination of interfaces toward policy control functions, enforcement of control part of a policy and QoS, lawful intercept (for an interface to SM event and L1 system), termination of SM part of a NAS message, downlink data notification, an initiator of AN specific SM information (sent to AN via the AMF over N2), SSC mode decision of the session, a roaming function, and the like.

Some or all functions of the SMF can be supported within a single instance of one SMF.

The UDM stores subscription data of user, policy data, etc. The UDM includes two parts, i.e., application front end (FE) and user data repository (UDR).

The FE includes UDM FE taking charge of location management, subscription management, processing of credential, etc. and PCF taking charge of policy control. The UDR stores data required for functions provided by the UDM-FE and a policy profile required by the PCF. Data stored in the UDR includes user subscription data including subscription identifier, security credential, access and mobility related subscription data, and session related subscription data and policy data. The UDM-FE accesses subscription information stored in the UDR and supports functions of authentication credential processing, user identification handling, access authentication, registration/mobility management, subscription management, SMS management, and the like.

The UPF transmits the downlink PDU received from the DN to the UE via the (R)AN and transmits the uplink PDU received from the UE to the DN via the (R)AN.

More specifically, the UPF supports functions of anchor point for intra/inter RAT mobility, external PDU session point of interconnect to data network (DN), packet routing and forwarding, packet inspection and user plane part of policy rule enforcement, lawful intercept, reporting of traffic usage, uplink classifier to support routing traffic flow to data network, branching point to support multi-homed PDU session, QoS handling (e.g., packet filtering, gating, uplink/downlink rate enforcement) for user plane, uplink traffic verification (service data flow (SDF) mapping between SDF and QoS flow), transport level packet marking in the uplink and downlink, downlink packet buffering and downlink data notification triggering, and the like. Some or all of the functions of the UPF can be supported in a single instance of one UPF.

AF interacts with 3GPP core network to provide services (e.g., support functions of an application influence on traffic routing, network capability exposure access, interaction with policy framework for policy control, and the like).

(R)AN collectively refers to a new radio access network supporting both evolved E-UTRA, that is an evolved version of 4G radio access technology, and a new radio (NR) access technology (e.g., gNB).

In the 5G system, a network node radio that is responsible for transmitting and receiving radio signals with the UE is gNB, and serves as the eNB in the EPS.

The gNB supports functions of radio resource management function (i.e., radio bearer control, radio admission control, connection mobility control, dynamic allocation of resources to the UE in uplink/downlink (scheduling)), Internet protocol (IP) header compression, encryption of user data stream and integrity protection, selection of AMF upon attachment of the UE if routing to the AMF is not determined from information provided to the UE, routing of user plane data to UPF(s), routing of control plane information to ANF, connection setup and release, scheduling and transmission of a paging message (generated from the AMF), scheduling and transmission of system broadcast information (generated from the AMF or operating and maintenance (O&M)), measurement and measurement reporting configuration for mobility and scheduling, transport level packet marking in uplink, session management, support of network slicing, QoS flow management and mapping to data radio bearer, support of a UE in an inactive mode, NAS message distribution function, NAS node selection function, radio access network sharing, dual connectivity, tight interworking between NR and E-UTRA, and the like.

The UE means a user equipment. The user equipment may be referred to as a term such as a terminal, a mobile equipment (ME), and a mobile station (MS). The user equipment may be a portable device such as a notebook computer, a cellular phone, a personal digital assistant (PDA), a smart phone, and a multimedia device, or a non-portable device such as a personal computer (PC) and a vehicle-mounted device.

Although unstructured data storage network function (UDSF), structured data storage network function (SDSF), network exposure function (NEF), and NF repository function (NRF) are not shown in this figure for clarity of explanation, all the NFs shown in this figure can perform interaction with the UDSF, the NEF and the NRF, if necessary.

The NEF provides a means to securely expose services and capabilities provided by 3GPP network functions, for example, 3rd party, internal exposure/re-exposure, application function, and edge computing. The NEF receives information from other network function(s) (based on exposed capabilities of other network function(s)). The NEF can store the received information as structured data using a standardized interface to a data storage network function. The stored information can be re-exposed by the NEF to other network functions and other application functions and can be used for other purposes such as analytics.

The NRF supports a service discovery function. The NRF receives NF Discovery Request from NF instance and provides information of the discovered NF instance to the NF instance. The NRF also maintains available NF instances and their supported services.

The SDSF is structured data by any NEF and is a selective function to support a storage and retrieval function of information.

The UDSF is unstructured data by any NF and is a selective function to support a storage and retrieval function of information.

In the 5G system, a node, that is responsible for transmitting and receiving radio signals with the UE, is gNB, and serves as the eNB in the EPS. If the UE is simultaneously connected to 3GPP access and non-3GPP access, the UE receives services via one AMF. When the UE is connected to the non-3GPP access and when the UE is connected to the 3GPP access, the UE may be connected to one same UPF, or connected to a plurality of different UPFs.

However, if the UE selects N3IWK (also referred to as 'non-3GPP interworking function (N3IWF)') in HPLMN in a roaming scenario and is connected to the non-3GPP access, the AMF managing the 3GPP access may be located in VPLMN and the AMF managing the non-3GPP access may be located in the HPLMN.

A non-3GPP access network is connected to the 5G core network via N3IWK/N3IWF. The N3IWK/N3IWF interfaces 5G core network control plane function and user plane function via the N2 and N3 interfaces, respectively.

A representative example of the non-3GPP access mentioned in the present disclosure may be WLAN access.

This figure illustrates a reference model where the UE accesses one DN using one PDU session for convenience of explanation merely by way of example, but the present disclosure is not limited thereto.

The UE can simultaneously access two (i.e., local and central) data networks using multiple PDU sessions. In this instance, two SMFs may be selected for different PDU sessions. Each SMF may have a capability capable of controlling both local UPF and central UPF within the PDU session. The SMF may be independently activated for each PDU session.

Further, the UE can simultaneously access two (i.e., local and central) data networks provided within a single PDU session.

In the 3GPP system, a conceptual link connecting between the NFs in the 5G system is defined as a reference point. The following illustrates reference points included in the 5G system architecture as represented in this figure.

N1: Reference point between the UE and the AMF
N2: Reference point between the (R)AN and the AMF
N3: Reference point between the (R)AN and the UPF
N4: Reference point between the SMF and the UPF
N5: Reference point between the PCF and the AF
N6: Reference point between the UPF and the data network
N7: Reference point between the SMF and the PCF
N24: Reference point between the PCF in the visited network and the PCF in the home network
N8: Reference point between the UDM and the AMF
N9: Reference point between two core UPFs
N10: Reference point between the UDM and the SMF
N11: Reference point between the AMF and the SMF
N12: Reference point between the AMF and the AUSF
N13: Reference point between UDM and Authentication Server function (AUSF)
N14: Reference point between two AMFs
N15: Reference point between the PCF and the AMF in case of non-roaming scenario, reference point between PCF in the visited network and AMF in case of roaming scenario
N16: Reference point between two SMFs (reference point between the SMF in the visited network and the SMF in the home network in case of roaming scenario)
N17: Reference point between AMF and EIR
N18: Reference point between any NF and UDSF
N19: Reference point between NEF and SDSF
N22: Reference point between NSSF and AMF FIG. 5 illustrates functions of NG-RAN and 5GC.

As illustrated in FIG. 5, NG-RAN may include gNB or NG-eNB entity described with reference to FIG. 4, and 5GC may include AMF, UPF, SMF entities and an internet entity connected to them. For example, the gNB or NG-eNB entity may be a logical node of the NG-RAN, and the AMF, UPF, SMF, and internet entities may be a logical node of the 5GC.

The gNB or NG-eNB entity may perform functions of inter-cell RRM, RB control, connection mobility control, radio admission control, measurement configuration and provision, and dynamic resource allocation (scheduling) (i.e., operation as scheduler).

The AMF may perform functions of NAS security and idle state mobility handling.

The UPF may perform functions of mobility anchoring and PDU handling.

The SMF may perform functions of UE IP address allocation and PDU session control.

Proximity Service (ProSe)

A 4G long term evolution (LTE) system may provide proximity service (ProSe). The standard technology related to the ProSe is described in 3GPP TS 23.401, 36.300, 36.331, and 36.321.

The ProSe function provides a direct communication technology between UEs as well as a wireless communication technology between a base station and a UE.

A transport channel providing the ProSe function is as follows.

1. Sidelink Broadcast Channel (SL-BCH):
The SL-BCH is determined by a pre-defined transport format.

2. Sidelink Discovery Channel (SL-DCH):
The SL-DCH has a fixed size, and is a pre-defined format periodic broadcast transmission.
The SL-DCH provides both functions of UE autonomous resource selection and scheduled resource allocation by eNB.
There is a collision risk due to support of the UE autonomous resource selection, and there is no collision when the UE is allocated dedicated resources by the eNB.
The SL-DCH supports HARQ combining, but does not support HARQ feedback.
The possibility to use uplink synchronization and timing advance depend on the physical layer.

3. Sidelink Shared Channel (SL-SCH):
The SL-SCH supports broadcast transmission.
The SL-SCH supports both functions of UE autonomous resource selection and scheduled resource allocation by eNB.
There is a collision risk due to support of the UE autonomous resource selection, and there is no collision when the UE is allocated dedicated resources by the eNB.
The SL-SCH supports HARQ combining, but does not support HARQ feedback.
The SL-SCH supports dynamic link adaptation by varying the transmit power, a modulation method, and a coding method.

As described above, the ProSe supports a ProSe discovery function and a ProSe communication function. The ProSe discovery function and the ProSe communication function are physically distinguished operations.

The ProSe discovery function is supported using a sidelink dedicated channel (SL-DCH). The ProSe communication function is supported using the SL-SCH.

For example, a specific user may enter a shopping mall and want to know if there is a store he or she wants, and respective stores that have entered the shopping mall may notify (or transmit) the user of its own store name. The user may identify what stores exist by recognizing (receiving) the store name notified (or transmitted) by each store in the corresponding shopping mall. Effectively supporting this situation is the ProSe discovery function.

However, the sidelink dedicated channel (SL-DCH) used in the ProSe discovery function is optimized for transmission of very small sized information. That is, the ProSe discovery function does not support the transmission and reception of user plane data. Hence, the ProSe discovery function has limited use. Specifically, the ProSe is a function made for the purpose of public safety such as police/fire station, and hence, security is important. Thus, information actually transmitted via the sidelink is limited, and security is configured. For example, a transmission side (e.g., store) transmits an encrypted code, and a reception side (e.g., user or UE) shall know the pre-encrypted corresponding code. If the reception side does not know the pre-encrypted corresponding code, the reception side requires an additional operation of accessing a server and finding out information (e.g., information about who the transmission side is) related to the transmission side.

On the other hand, in the ProSe communication function, for example, two UEs may directly perform a voice call. Hence, it is designed to send and receive more data in supporting the ProSe communication function.

FIGS. 6 to 8 illustrate protocol layer architectures of different UEs.

As illustrated in FIG. 6, a sidelink discovery function is defined as a procedure that is used by the UE supporting the sidelink discovery function to discover other UE(s) in its proximity. In this case, the UE uses E-UTRA direct radio signals via PC5 (or PC5 reference point). The PC5 (or PC5 reference point) may be an entity performing the same function as MAC MAC (Media Access Control) of LTE/NR.

The sidelink discovery function is supported both when the UE is served by EUTRAN and when the UE is out of EUTRA coverage. When the UE is out of the EUTRA coverage, only ProSe-enabled public safety UE can perform the sidelink discovery function. For a public safety sidelink discovery function, the allowed frequency is pre-configured in the UE, and is used even when the UE is out of coverage of EUTRA in the corresponding frequency. The pre-configured frequency is the same frequency as the public safety ProSe carrier.

A sidelink communication function is a mode of communication whereby UEs can communicate with each other directly over the PC5 interface. This communication mode is supported both when the UE is served by EUTRAN and when the UE is out of EUTRA coverage. Only those UEs authorized to be used for public safety operation can perform the sidelink communication function.

In order to perform synchronization for out of coverage operation, UE(s) may act as a synchronization source by transmitting SBCCH and a synchronization signal. The SBCCH carries the most essential system information needed to receive other sidelink channels and signals. The SBCCH along with the synchronization signal is transmitted with a fixed periodicity of 40 ms.

When the UE is in network coverage, the contents of SBCCH are derived from parameters signalled by the eNB. When the UE is out of coverage, if the UE selects another UE as a synchronization reference, then the contents of SBCCH are derived from the received SBCCH. When the UE is out of coverage, if the UE does not select another UE as a synchronization reference, then the UE uses pre-configured parameters.

SIB18 provides resource information for synchronization signal and SBCCH transmission. There are two pre-configured subframes every 40 ms for out of coverage operation. If the UE becomes a synchronization source, the UE receives the synchronization signal and the SBCCH in one subframe and transmits the synchronization signal and the SBCCH on another subframe based on defined criterion.

The UE may perform the sidelink communication function on subframes defined over the duration of a sidelink control period. The sidelink control period is a period over which resources allocated in a cell for the sidelink control information and sidelink data transmissions occur.

Within the sidelink control period, the UE may transmit sidelink control information followed by sidelink data. The sidelink control information indicates a Layer 1 ID and characteristics of the transmissions (e.g., MCS, location of the resource(s) over the duration of sidelink control period, timing alignment, etc.).

Problem of Related Art

The 5G communication system supports ultra-low latency, enhanced mobile broadband, and massive connectivity, compared to the existing communication system. Hence, the 5G communication system is expected to provide a wide range of connection services between things focusing on Machine-to-Machine (M2M) in the existing human-centered Human-to-Human (H2H)/Human-to-Machine (H2M) connection.

Based on this, moving objects such as drones or cars can be continuously connected to each other using a cellular communication network, and new services using this are also variously emerging.

In a communication environment based on the existing 4G communication system, a model in which a human accesses the Internet using a smartphone and is provided with services is basically used. In particular, a client-server model is used, in which a human is provided with services by connecting each application installed on each smartphone to a server connected to the Internet network.

In the client-server model, the quality of service provided to each smartphone/user is not determined by which application smartphones/users located around the smartphone/user are using. That is, if each smartphone/user has a communication function of capable of accessing the server and only applications the user wants to use are installed on each smartphone, each smartphone/user can be provided with desired services.

However, as the 5G communication system develops, the paradigm has changed from human-centered communication to object-centered communication. For example, a communication and application environment using a vehicle may be different from the situation seen in the existing 4G communication system for the following reasons.

For example, the vehicle is basically based on high-speed mobility, and the case in which the vehicle is out of coverage of the base station frequently occurs. In this case, there are many cases in which the vehicle is in a situation where communication with a server of the backend connected to the Internet is not smooth.

Many applications installed in the vehicle often provide safety-related functions. A counterpart (e.g., pedestrians, other vehicles) from the vehicle's perspective is also often located close enough to be careful about safety.

If applications installed in the vehicle are not supported by applications of other vehicles or are not compatible with applications of other vehicles, user utility is degraded.

For example, there is a cooperative awareness (CA) service as a service for safe driving and collision prevention of vehicles. In the CA service, each vehicle transmits information such as its location/speed/direction to other neighboring vehicles at least once every second.

In order for a specific vehicle to use the CA service, it is necessary for the specific vehicle to send a transmission message related to the CA service to other vehicles and also receive a message related to the CA service from neighboring vehicles. That is, when the corresponding vehicle intends to use the CA service, it is difficult to use the CA service installed in the corresponding vehicle if there is no vehicle supporting the CA service among the neighboring vehicles.

In the above aspect, a communication environment and application usage pattern between vehicles is different from a smartphone-centered human usage pattern.

Accordingly, in a communication process between vehicles, it is necessary for respective users to quickly determine whether or not neighboring objects (e.g., other vehicles) support the corresponding application before using the application. However, in the related art, unnecessary connection latency occurs in a process of changing each physical channel by using a separate physical channel in the corresponding case.

The related art has a disadvantage in that it does not eliminate the risk of an accident by causing latency in information transmission for a vehicle that needs to quickly exchange information with other vehicles for safety.

Embodiments of the Present Disclosure

In the present disclosure, a service can be used as the same meaning as an application or an app, and may mean all types of services supported in each UE.

In the present disclosure, MAC can be used as the same meaning as PC5 or PC5 reference point.

In the present disclosure, a V2X layer is a manager for managing V2X service, and may be referred to as a service manger, a service protocol, or a service layer.

First Embodiment

The present disclosure proposes a method in which a specific UE determines an application (or service) used/supported by other UEs, and efficiently and rapidly identifies which application (service) the corresponding UE can use.

In particular, the present disclosure proposes a method which a protocol data unit (PDU) transmitted to a physical channel includes information informing whether information of the corresponding PDU is application data or information for determining whether to support an application, in order for the UE to quickly identify an application supported by other UEs even if a specific physical channel is used to transmit various application data of various UEs.

FIG. 9 is a flow chart illustrating a service identification method according to a first embodiment of the present disclosure.

As illustrated in FIG. 9, according to the first embodiment of the present disclosure, a UE performs step S900 (including steps S910, S930, S950, and S970) and thus can identify a service supportable in neighboring UEs. This is described in detail below.

FIG. 9 illustrates that a first UE performs the step S910 and then performs the steps S930, S950 and S970, but the present disclosure is not necessarily limited thereto. For example, unlike FIG. 9, a request generating step (S910) and a first service data transmitting/receiving step (S970) need not be necessarily performed. That is, the first UE may not perform the step S910, perform only the steps S930 and S950, and may not perform the step S970.

First, the first UE may generate a request (MAC PDU) including transmission side UE information (first UE user information) and an enquiry related to a first service in S910.

For example, the first UE may include the transmission side UE information in an MAC header of the MAC PDU and include the enquiry related to the first service in an MAC service data unit (SDU) of the MAC PDU.

For example, the first service may be an application (service) provided by an application layer (service layer) of the first UE. The first service may be, for example, V2X service.

For example, the enquiry related to the first service may include a message inquiring whether a specific service (or application) is supportable. For example, a service related enquiry may include a message inquiring all supportable services. For example, the enquiry related to the first service may include a message inquiring all services that are supportable in a specific region. For example, the enquiry related to the first service may include an enquiry related to supportable services and a supportable location for each service. For example, the enquiry related to the first service may include a message related to whether a first service is supportable and performance or conditions for supporting the first service. For example, the message related to the performance or conditions for supporting the first service of the UE may include information related to quality of service (QoS). Herein, the information related to QoS may include PC5 QoS flow(s), and may include PFI and corresponding PC5 QoS parameters (e.g., other parameters such as PQI and MFBR/GFBR) per each PC5 QoS flow.

Next, the first UE may transmit the request (MAC PDU) including the transmission side UE information and the enquiry related to the first service to other UE (e.g., second UE) around the first UE in S930.

For example, the first UE may broadcast the above request to the other UE, but the present disclosure is not limited thereto. For example, the first UE may groupcast the above request to the other UE.

Next, the first UE may receive, from at least one (e.g., second UE) of a plurality of UEs around the first UE, an enquiry response including a response (e.g., information related to the first service or other supportable services) to the enquiry related to the first service in S950.

For example, the first UE may receive the above response in the form of MAC PDU.

For example, the response may include whether the first service is supportable. For example, the response may include a list of supportable services. For example, the enquiry response may include supportable services and an identifier of the UE capable of supporting the corresponding service. For example, the enquiry response may include information related to supportable services and a supportable location for each service. For example, the enquiry response may include services that are supportable in a specific region. For example, the enquiry response may include information related to performance of the responding UE. For example, the information related to the performance of the UE may include information related to quality of service (QoS). Herein, the information related to QoS may include PC5 QoS flow(s), and may include PFI and corresponding PC5 QoS parameters (e.g., other parameters such as PQI and MFBR/GFBR) per each PC5 QoS flow.

Subsequently, the first UE may transmit and receive the corresponding service data to and from at least one of neighboring UEs based on the enquiry response, in order to provide the first service in S970.

Herein, the first UE may transmit and receive the corresponding service data to and from other UE in an unicast manner, and the present disclosure is not limited thereto.

1-1 Embodiment

FIG. 10 illustrates architecture of an MAC PDU according to a first embodiment of the present disclosure.

An MAC PDU illustrated in FIG. 10 may be transmitted via a sidelink shared channel (SL-SCH) of NR/LTE.

As illustrated in FIG. 10(*a*), a general MAC PDU 1000A may include an MAC header 1010A and an MAC SDU 1020A.

As illustrated in FIG. 10(*b*), a UE according to an embodiment of the present disclosure may specify the MAC PDU illustrated in FIG. 10(*a*). For example, an MAC PDU 1000B may include a V (version number) field 1011B, a source field 1012B, a destination field 1013B, a logical channel ID (LCID) field 1014B, and an MAC SDU 1020B. The V field 1011B may include information related to a format version of the MAC PDU 1000B. The source field 1012B may include information related to a transmission side of the MAC PDU 1000B. The destination field 1013B may include information related to a reception side of the MAC PDU 1000B. The LCID field 1014B may include information related to a specific logical channel for transmitting the MAC SDU 1020B, or information informing what content is included in information included in the MAC SDU 1020B, in a combination of the source field and the destination field. The MAC SDU 1020B may include a higher data protocol unit transmitted from a higher entity indicated by the LCID or specific control information indicated by the LCID.

As illustrated in FIG. 10(*c*), the UE may configure a specific value (discovery) to a V field 1011C, and may indicate discovering a service/application using an MAC SDU 1020C included in an MAC PDU 1000C, through the V field 1011C.

As illustrated in FIG. 10(*d*), the UE may configure a specific value to a destination field 1013D, and may indicate discovering a service/application using an MAC SDU 1020D included in an MAC PDU 1000D, through the destination field 1013D.

As illustrated in FIG. 10(*e*), the UE may configure a specific value to an LCID field 1014E, and may indicate discovering a service/application using an MAC SDU 1020E included in an MAC PDU 1000E, through the LCID field 1014E.

Through the method illustrated in FIGS. 10(*b*) to 10(*e*), the UE may transmit and receive information required to identify applications installed in other UEs around the UE or applications supported by other UEs as well as application data, via the same physical channel.

Through the MAC PDUs 1000B, 1000C, 1000D and 1000E illustrated in FIGS. 10(*b*) to 10(*e*), the UE may request information related to a supportable application from each of other UEs.

The UE may also transmit, to other UEs, information related to an application that is supportable by the UE itself. For example, the UE may unicast, to other UEs, information related to a service type of an application (or service) that is supportable by the UE itself. More specifically, the UE may transmit, to other UEs, an ID (e.g., PSID or ITS-AID) of a V2X application (V2X service) that is supportable by the UE itself.

FIG. 11 illustrates an example where a UE transmits and receives information related to an application to and from other UEs in accordance with the first embodiment of the present disclosure.

As illustrated in FIG. 11, a method in which a UE transmits and receives information (e.g., application data or information related to supportable applications) related to an application to and from other UEs may include steps S1101 to S1110, and this method is described in detail below.

A wireless communication system 1100 according to an embodiment of the present disclosure may include a first UE 1110, a second UE 1120, and a third UE 1130. Each of the first UE 1110, the second UE 1120, and the third UE 1130 may include V2X layer and MAC, may be installed with the partial same application (app), and may support the partial same application.

The V2X layer may serve as a manager (i.e., service manager) managing an application (app) or a service installed in each UE. The V2X layer may receive a discovery request from the app or service installed in each UE, and transmit a discovery result as a response to the discovery request to the app or service installed in each UE. The V2X layer may serve as a medium connecting the AS and the NAS that are described above with reference to FIG. 1. The V2X layer may be implemented as a protocol that informs whether a specific app (or service) is supportable by other UEs, but the present disclosure is not limited thereto.

The MAC may be used as the same meaning as PC5 as mentioned above with reference to FIG. 6.

This figure illustrates that the first UE 1110 is installed with an app A(1111) and an app B(1112) and can support the app A and the app B, the second UE 1120 is installed with an app A(1121) and an app C(1122) and can support the app A and the app C, and the third UE 1130 is installed with an app D(1131) and an app E(1132) and can support the app D and the app E.

First, the app A (1111) installed in the first UE 1110 may transmit an app A search request to a V2X layer 1113 in S1101. The app A (1111) needs to exchange data with the app A(1121) installed in other UE (e.g., the second UE or the third UE). Thus, the app A (1111) shall discover a UE supporting the app A among neighboring UEs. To this end, the app A can request the V2X layer 1113 to discover (or search) whether a UE supporting the app A exists in the periphery.

Subsequently, the V2X layer 1113 of the first UE 1110 may transmit an MAC SDU (service enquiry) to an MAC 1114 in S1102. For example, in order to discover whether a UE supporting the app A (or service A) exists around the first UE 1110, the V2X layer 1113 may include a service enquiry message in the MAC SDU, and may request the MAC 1114 to transmit the MAC SDU including the service enquiry message to other UE.

More specifically, the V2X layer 1113 may include the MAC SDU including the service enquiry message in an MAC PDU. The V2X layer 1113 may also indicate, within the MAC PDU, that the service enquiry message is included in the MAC SDU of the MAC PDU. For example, the V2X layer 1113 may include an indicator, that the service enquiry message is included in the MAC SDU included in the MAC PDU, in a specific field (see FIG. 10(*b*), 10(*c*), 10(*d*) or 10(*e*)) within an MAC header included in the MAC PDU.

At the same time as this, the V2X layer 1113 may indicate that information other than application data is included in the MAC SDU of the MAC PDU (i.e., the application data is not included). For example, the V2X layer 1113 may include an indicator, that information other than application data is included in the MAC SDU of the MAC PDU (i.e., an indicator that the application data is not included), in a specific field (see FIG. 10(*b*), 10(*c*), 10(*d*) or 10(*e*)) within the MAC header included in the MAC PDU.

For another example, the service enquiry message may include a message requesting whether to support the app A that is a specific app, unlike the above example. That is, if it is intended to identify only a UE supporting a specific app (service), the service enquiry message may include a message requesting whether to support the specific app. For another example, the service enquiry message may include a message requesting information related to all apps (services) supported by other neighboring UEs, unlike the above example.

If it is intended to identify only a UE supporting a specific app (service), the service enquiry message may include identification information (specific app (service) ID) related to the specific app (service). If it is intended to identify all apps (services) supported by other neighboring UEs, the service enquiry message may not include identification information (specific app (service) ID) related to the specific app (service).

Next, the MAC 1114 of the first UE 1110 may transmit the MAC PDU to the second UE 1120 and the third UE 1130 that are UEs around the first UE 1110, in S1103A and S1103B. Each of an MAC 1124 of the second UE 1120 and an MAC 1134 of the third UE 1130 may receive the MAC PDU from the MAC 1114 of the first UE 1110.

For the second UE 1120 in which an app A (service A) and an app B (service B) are installed, the MAC 1124 of the second UE 1120 may send a V2X layer 1123 of the second UE 1120 the MAC SDU (service enquiry message) within the MAC PDU transmitted from the MAC 1114 of the first UE 1110. More specifically, the MAC 1124 of the second UE 1120 may analyze an MAC header of the received MAC PDU. The MAC 1124 may identify that the service enquiry message is included in the MAC SDU included in the MAC PDU. In this case, the MAC 1124 may send the MAC SDU (service enquiry message) including the service enquiry message to the V2X layer 1123 of the second UE 1120.

Next, the V2X layer 1123 of the second UE 1120 may send the MAC SDU (a response to the service enquiry message) to the MAC 1124 of the second UE 1120. More specifically, the V2X layer 1123 of the second UE 1120 may check information related to an app or a service that is installed in the second UE 1120 or is supportable by the second UE 1120. As a result of checking, the V2X layer 1123 may check the app A(1121) and the app C(1122) using an app that is installed in the second UE 1120 or is supportable by the second UE 1120.

If the service enquiry message included in the MAC SDU within the MAC PDU transmitted from the first UE 1110 is a message discovering whether to support a specific app A (service A), the app A (service A) is supportable in the second UE 1120. Therefore, the V2X layer 1123 of the second UE 1120 may include a service response message, that the specific app A (service A) is supportable, in the MAC SDU and send the service response message to the MAC 1124 of the second UE 1120.

If the service enquiry message included in the MAC SDU within the MAC PDU transmitted from the first UE 1110 is a message discovering all apps or all services supportable in the second UE 1120, the V2X layer 1123 of the second UE 1120 may include a response message, that the app A and the app C are supportable, in the MAC SDU and send the response message to the MAC 1124 of the second UE 1120.

For the third UE 1130 in which an app A (service A) is not installed and an app D and an app E are installed, in the same manner as the second UE 1120, the MAC 1134 of the third UE 1130 may send a V2X layer 1133 of the third UE 1130 the MAC SDU (service enquiry message) within the MAC PDU transmitted from the MAC 1114 of the first UE 1110, in S1104B. More specifically, the MAC 1134 of the third UE 1130 may analyze an MAC header of the received MAC PDU. The MAC 1134 may identify that the service enquiry message is included in the MAC SDU included in the MAC PDU. In this case, the MAC 1134 of the third UE 1130 may send the MAC SDU (service enquiry message) including the service enquiry message to the V2X layer 1133 of the third UE 1130.

Next, the V2X layer 1133 of the third UE 1130 may send the MAC SDU (a response to the service enquiry message) to the MAC 1134 of the third UE 1130. More specifically, the V2X layer 1133 of the third UE 1130 may check information related to an app or a service that is installed in the third UE 1130 or is supportable by the third UE 1130. As a result of checking, the V2X layer 1133 may check the app D(1131) and the app E(1132) using an app that is installed in the third UE 1130 or is supportable by the third UE 1130.

If the service enquiry message included in the MAC SDU within the MAC PDU transmitted from the first UE 1110 is a message discovering whether to support a specific app A (service A), the V2X layer 1133 of the third UE 1130 may not send a response because the app A (service A) is not installed in the third UE 1130 (because the third UE 1130 does not support the app A). On the contrary, the V2X layer 1133 of the third UE 1130 may send a message, that the third UE 1130 does not support the app A, to the MAC 1134 so that the V2X layer 1133 responses to the first UE 1110 by including the message, that the third UE 1130 does not support the app A, in the MAC SDU. However, the present disclosure is not limited thereto.

If the service enquiry message included in the MAC SDU within the MAC PDU transmitted from the first UE 1110 is a message discovering all apps or all services supportable in the third UE 1130, the V2X layer 1133 of the third UE 1130 may include a response message, that the app D and the app E are supportable, in the MAC SDU and send the response message to the MAC 1134 of the third UE 1130.

If the V2X layer 1123 of the second UE 1120 decides to respond to the service enquiry message of the first UE 1110, the V2X layer 1123 of the second UE 1120 may include an identifier (second UE ID) of the second UE 1120 in a service response message that is a response to the service enquiry message, include the service response message including the identifier of the second UE 1120 in the MAC SDU, and transmit it to the MAC 1124 so that it is transmitted to the first UE 1110. In this case, the MAC 1124 can rapidly know which UE the app A(1111) of the first UE 1110 can communicate with.

Subsequently, the MAC 1124 of the second UE 1120 may transmit the MAC PDU including the MAC SDU (service response message) sent from the V2X layer 1123 to the MAC 1114 of the first UE 1110 in S1106.

If the MAC 1114 of the first UE 1110 receives the MAC PDU from the MAC 1124 of the second UE 1120, the MAC 1114 of the first UE 1110 may analyze the MAC PDU and send the MAC SDU (service response message) included in the MAC PDU received from the MAC 1124 of the second UE 1120 to the V2X layer 1113 of the first UE 1110 based on a result of analysis, in S1107.

If the V2X layer 1113 of the first UE 1110 receives the MAC SDU (service response message), the V2X layer 1113 of the first UE 1110 may send the app A(1111) of the first UE 1110 an app A search request response that is a response to the app A search request transmitted from the app A(1111) in the step S1101.

More specifically, the V2X layer 1113 of the first UE 1110 may analyze the received MAC SDU (service response message) and determine that there is a UE capable of supporting the app A among neighboring UEs based on a result of analysis. Hence, the V2X layer 1113 of the first UE 1110 may include information, that there is a UE capable of supporting the app A among the neighboring UEs, in the app A search request response and send it to the app A(1111).

If an identifier of the second UE 1120 is included in the service response message, the V2X layer 1113 of the first UE 1110 may check that the UE capable of supporting the app A among the neighboring UEs is the second UE 1120. In this case, the V2X layer 1113 of the first UE 1110 may include, in the app A search request response, both information, that there is a UE supporting the app A among the neighboring UEs, and the identifier of the second UE 1120 representing that the UE supporting the app A among the neighboring UEs is the second UE 1120, and may send it to the app A(1111).

After the app A(1111) obtains information, that there is a UE supporting the app A among the neighboring UEs, the app A(1111) may configure user data for the app A itself or a signalling message and transmit it to the MAC 1114 of the first UE 1110, in order to communicate with the UE supporting the app A, in S1109. In this case, a data message of the app A may be sent to the MAC 1114 directly via the user plane (not shown) without passing the V2X layer 1113.

The MAC 1114 receiving the user data for the app A itself or the signalling message from the app A(1111) may construct the MAC PDU and transmit it to the second UE 1120, in S1110. In this case, the MAC 1114 may construct other MAC PDU that is distinguished from the MAC PDU of the V2X layer 1113 used in the step S1102.

Second Embodiment

In a second embodiment, a UE may perform a service/application discovery function using an RLC/PDCP entity not an MAC PDU. For example, the UE may configure a filed indicating a payload type in a PDCP header. The UE may indicate whether to include a service enquiry message for V2X service discovery by configuring a specific value to the corresponding field.

FIG. 12 illustrates a PDCP structure according to a second embodiment of the present disclosure.

As illustrated in FIG. 12(a), the UE may construct a general PDCP PDU. A PDCP PDU 1200A may include a PDCP header 1210A and a PDCP SDU 1220A.

As illustrated in FIG. 12(b), the UE may indicate that an SDU Type of a PDCP SDU 1220B is Data via a PDU header 1210B of a PDCP PDU 1200B. In this case, data obtained in a higher application (service) may be included in the PDCP SDU 1220B.

As illustrated in FIG. 12(c), the UE may indicate that an SDU Type of a PDCP SDU 1220C is Discovery via a PDU header 1210C of a PDCP PDU 1200C. That is, both a UE transmitting the PDCP PDU 1200C and a UE receiving the PDCP PDU 1200C may recognize that a service enquiry message (protocol data information discovering/inquiring whether which app (service) is supported in each UE) is included in the PDCP SDU 1220C of the corresponding PDCP PDU 1200C. Even in this case, in the same manner as the description with reference to FIG. 11, the UE may obtain whether to support a specific app in neighboring UEs and information related to all apps supportable in neighboring UEs via the PDCP PDU 1200C.

Third Embodiment

A vehicle (UE) has a starting point and a destination, and a user may want to use various V2X services at each point on a route. In particular, the user may change the route or reserve the use of V2X services according available V2X services at each point.

For example, when a vehicle uses a highway, various service areas may exist on each route. In this case, each service area may provide a different V2X service. For example, one service area may provide a parking area advance reservation service, and another service area may provide an automatic remote parking service. Thus, the user of the vehicle may decide which service area to go to according to his or her preferences or services supported by the vehicle. In order to support such a scenario, the first and second embodiments described above are further extended.

3-1 Embodiment

First, location information of the corresponding UE may be included in a service enquiry message included in the PDU generated in the V2X layer illustrated in FIGS. 9 to 12. For example, when a UE supporting a specific service or neighboring UEs want to acquire information related to all supportable services, the UE may send the service enquiry message to the neighboring UEs. In this case, the UE may include, in the service enquiry message, a request for information related to where the UE supporting the corresponding service is located or information related to supportable services in a specific region.

An entity (UE or object supporting at least one service) receiving the corresponding service enquiry message may include, in a service response message that is a response to the service enquiry message, information of the V2X service, that is available or supportable (providable) in a specific region, indicated by the service enquiry message, and may respond to this. For another example, an entity receiving the service enquiry message not including information about a specific region may include, in the service response message, information related to which region the available V2X service is supportable, and may transmit it.

Since the above region to provide the service may be farther than a distance (coverage area) capable of direct communication between vehicles, a server that is the entity may transmit the service response message instead of another vehicle, after receiving the service enquiry message.

FIG. 13 illustrates a service response message according to a 3-1 embodiment.

As illustrated in FIGS. 13(a) and 13(b), a UE may construct service enquiry messages 1300A and 1300B. That is, the UE may include, in the service enquiry messages 1300A and 1300B, message type fields 1311A and 1311B and fields 1321A and 1322B whether a location is included or not.

For example, when the UE wants to request all services supportable in a specific region through the service enquiry message, the UE may construct a service enquiry message as illustrated in FIG. 13(a). More specifically, as illustrated in FIG. 13(a), the UE may indicate that the corresponding message 1300A is a service enquiry message (Message Type=Service Enquiry), through the message type field 1311A. The UE may also indicate that the UE requests location information from the corresponding message 1300A ('location included'='yes'), through the field 1321A whether to request a location, and may additionally include a request location field (Location Info) 1331A in the service enquiry message 1300A.

For another example, when the UE wants to request only information related to supportable services through the service enquiry message, the UE may construct a service request message as illustrated in FIG. 13(b). That is, as illustrated in FIG. 13(b), the UE may indicate that the corresponding message 1300B is a service enquiry message (Message Type=Service Enquiry), through the message type field 1311B. The UE may also indicate that a request location field is not included in the corresponding message 1300B ('location included'='No'), through the field 1321B whether to request a location.

As illustrated in FIGS. 13(c) and 13(d), the UE may construct service response messages 1300C and 1300D. That is, the UE may include, in the service response messages 1300C and 1300D, message type fields 1312C and 1312D and service name fields 1341C, 1342C, 1341D and 1342D.

For example, when the UE receives a request for information related to all services supportable in a specific region through the service enquiry message, the UE may construct a service response message as illustrated in FIG. 13(c). For example, as illustrated in FIG. 13(c), the UE may indicate that the corresponding message 1300C is a service response message (Message Type=Service response), through the message type field 1312C. The UE may also configure information (Location Info) related to a location capable of supporting a service A to a service A location field 1351C while configuring a name of the service A supportable in the corresponding message 1300C to the service name field 1341C ('Service name'='A'). In the same manner, the UE may also configure information (Location Info) related to a location capable of supporting a service B to a service B location field 1352C while configuring a name of the service B supportable in the corresponding message 1300C to the service name field 1342C ('Service name'='B').

For another example, when the UE receives a request for only information related to supportable services through the service enquiry message, the UE may construct a service response message as illustrated in FIG. 13(*d*). More specifically, as illustrated in FIG. 13(*d*), the UE may indicate that the corresponding message 1300D is a service response message (Message Type=Service response), through the message type field 1312D. The UE may not configure information related to a location capable of supporting the service A while configuring a name of the service A supportable in the corresponding message 1300D to the service name field 1341D ('Service name'='A'). In the same manner, the UE may not configure information related to a location capable of supporting the service B while configuring a name of the service B supportable in the corresponding message 1300D to the service name field 1342D ('Service name'='B').

Fourth Embodiment

Even if each UE (vehicle) supports the same V2X service, a difference in capability (e.g., quality of service (QoS)) for supporting each V2X service may occur between different UEs. For example, in a service, such as see-through, that intends to check a traffic situation in front through a vehicle in front, a support vehicle, that takes a video in the front of a request vehicle and provides the video, and the request vehicle that receives the video in the rear of the support vehicle shall support the same video codec. In order for the support vehicle located in the front to support the see-through service, a camera installed in the corresponding support vehicle shall face forward.

Accordingly, the fourth embodiment can extend the service enquiry message described above.

More specifically, the UE may discover other UE having only a specific capability or a specific condition using the service enquiry message.

For example, the UE may include, in the service enquiry message, information related to a requirement capability for supporting a service in other UE receiving the message or information related to requirements for supporting a service by each UE and may transmit in to the other UE. For example, information related to a capability at which other UE provides a service may include information related to quality (quality of service (QoS)) providing the services in the corresponding UE.

In this case, only when the UE receiving the service enquiry message satisfies a capability (QoS) or conditions that the UE itself indicates in the service enquiry message, the UE may respond to a service response message. In another case, the UE receiving the service enquiry message may respond to a transmission side UE with information related to the capability (QoS) or conditions that the UE itself indicates in the service enquiry message.

Overview of Device to which the Present Disclosure is Applicable

FIG. 14 illustrates a block configuration diagram of a communication device according to an embodiment of the present disclosure.

Referring to FIG. 14, a wireless communication system includes a network node 1410 and a plurality of UEs 1420.

The network node 1410 includes a processor 1411, a memory 1412, and a communication module 1413. The processor 1411 may implement functions, processes, embodiments and/or methods described above, and may be described by being identified with the network node 1410 for convenience of explanation in the present disclosure. Layers of wired/wireless interface protocol may be implemented by the processor 1411. The memory 1412 is connected to the processor 1411 and stores various types of information for driving the processor 1411. The communication module 1413 is connected to the processor 1411 and transmits and/or receives wired/wireless signals. An example of the network node 1410 may correspond to a base station, MME, HSS, SGW, PGW, an application server, or the like. In particular, if the network node 1410 is the base station, the communication module 1413 may include a radio frequency (RF) unit for transmitting/receiving a radio signal.

The UE 1420 includes a processor 1421, a memory 1422, and a communication module (or RF unit) 1423. The processor 1421 may implement functions, processes, embodiments and/or methods described above, and may be described by being identified with the UE 1420 for convenience of explanation in the present disclosure. Layers of a radio interface protocol may be implemented by the processor 1421. The memory 1422 is connected to the processor 1421 and stores various types of information for driving the processor 1421. The communication module 1423 is connected to the processor 1421 and transmits and/or receives a radio signal.

The memories 1412 and 1422 may be inside or outside the processors 1411 and 1421 and may be connected to the processors 1411 and 1421 through various well-known means. Further, the network node 1410 (in case of the base station) and/or the UE 1420 may have a single antenna or multiple antennas.

FIG. 15 illustrates a block configuration diagram of a communication device according to an embodiment of the present disclosure.

In particular, FIG. 15 illustrates in more detail the UE illustrated in FIG. 14.

Referring to FIG. 15, the UE may include a processor (or digital signal processor (DSP)) 1510, an RF module (or RF unit) 1535, a power management module 1505, an antenna 1540, a battery 1555, a display 1515, a keypad 1520, a memory 1530, a subscriber identification module (SIM) card 1525 (which is optional), a speaker 1545, and a microphone 1550. The UE may also include a single antenna or multiple antennas.

The processor 1510 implements functions, processes, and/or methods described above. Layers of a radio interface protocol may be implemented by the processor 1510.

The memory 1530 is connected to the processor 1510 and stores information related to operations of the processor 1510. The memory 1530 may be inside or outside the processor 1510 and may be connected to the processors 1510 through various well-known means.

A user inputs instructional information, such as a telephone number, for example, by pushing (or touching) buttons of the keypad 1520 or by voice activation using the microphone 1550. The processor 1510 receives and processes the instructional information to perform an appropriate function, such as to dial the telephone number. Operational data may be extracted from the SIM card 1525 or the memory 1530. Further, the processor 1510 may display instructional information or operational information on the display 1515 for the user's reference and convenience.

The RF module 1535 is connected to the processor 1510 and transmits and/or receives an RF signal. The processor 1510 forwards instructional information to the RF module 1535 in order to initiate communication, for example, transmit a radio signal configuring voice communication data. The RF module 1535 includes a receiver and a transmitter to receive and transmit the radio signal. The antenna 1540 functions to transmit and receive the radio signal. Upon reception of the radio signal, the RF module 1535 may send a signal to be processed by the processor 1510 and convert the signal into a baseband. The processed signal may be converted into audible or readable information output via the speaker 1545.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute an embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

In the present disclosure, 'A and/or B' may mean at least one of A and/or B.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

INDUSTRIAL APPLICABILITY

Although the present disclosure has been described focusing on examples applying to the 3GPP LTE/LTE-A/NR (5G) system, it can be applied to various wireless communication systems other than the 3GPP LTE/LTE-A/NR (5G) system.

The invention claimed is:

1. A method performed by a first user equipment (UE) in a wireless communication system, the method comprising:
transmitting, to a second UE, a request message which is related to a first service;
receiving, from the second UE, a response message in response to the request message; and
transmitting, to the second UE, data related to the first service, based on the response message,
wherein the request message includes identification information related to the first UE,
wherein, based on the first service including a V2X service, the request message includes V2X service information for transmitting and receiving V2X service data.

2. The method of claim 1, wherein the identification information related to the first UE includes transmission side user information for the request message.

3. The method of claim 1, wherein the request message includes reception side user information for the request message.

4. The method of claim 1, wherein, based on the first service including the V2X service, the response message includes identification information of a vehicle related to the second UE.

5. The method of claim 1, wherein the request message includes service requirements for transmitting and receiving the data related to the first service.

6. The method of claim 1, wherein the request message includes a request as to whether the first service is supportable.

7. The method of claim 6, wherein the request message further includes an indicator informing the second UE that the request as to whether the first service is supportable is included in the request message.

8. The method of claim 1, wherein the request message includes a request for another service supportable by the second UE, other than the first service.

9. The method of claim 1, wherein the request message includes a request for a location at which the first service is supported.

10. The method of claim 1, wherein the request message includes a request for another service supported in a specific region pre-specified by the first UE.

11. A first user equipment (UE) operating in a wireless communication system, the first UE comprising:
a transmitter and receiver configured to transmit and receive a signal;
a memory configured to store data; and
a processor configured to control the transmitter and receiver, and the memory, wherein the processor is configured to:
transmit, to a second UE, a request message which is related to a first service;
receive, from the second UE, a response message in response to the request message; and
transmit, to the second UE, data related to the first service, based on the response message,
wherein the request message includes identification information related to the first UE,
wherein, based on the first service including on a V2X service, the request message includes V2X service information for transmitting and receiving V2X service data.

12. The first UE of claim 11, wherein the identification information related to the first UE includes transmission side user information for the request message.

13. The first UE of claim 11, wherein the request message includes reception side user information for the request message.

14. The first UE of claim 11, wherein, based on the first service including the V2X service, the response message includes identification information of a vehicle related to the second UE.

15. The first UE of claim 11, wherein the request message includes service requirements for transmitting and receiving the data related to the first service.

16. The first UE of claim 11, wherein the request message includes a request as to whether the first service is supportable.

17. The first UE of claim 16, wherein the request message further includes an indicator informing the second UE that the request as to whether the first service is supportable is included in the request message.

18. The first UE of claim 11, wherein the request message includes a request for a location at which the first service is supported.

19. The first UE of claim 11, wherein the request message includes a request for another service supported in a specific region pre-specified by the first UE.

20. A method performed by a second user equipment (UE) in a wireless communication system, the method comprising:

receiving, from a first UE, a request message which is related to a first service;

transmitting, to the first UE, a response message in response to the request message; and receiving, from the first UE, data related to the first service which is transmitted based on the response message, wherein the request message includes identification information related to the first UE, wherein, based on the first service including a V2X service, the request message includes V2X service information for transmitting and receiving V2X service data.

* * * * *